United States Patent
Masuda et al.

(10) Patent No.: US 9,477,503 B2
(45) Date of Patent: Oct. 25, 2016

(54) RESOURCE MANAGEMENT SERVER, RESOURCE MANAGEMENT METHOD AND STORAGE MEDIUM FOR IDENTIFYING VIRTUAL MACHINES SATISFYING RESOURCE REQUIREMENTS

(75) Inventors: Mineyoshi Masuda, Kawasaki (JP); Yasuyuki Mimatsu, Kawasaki (JP); Kiminori Sugauchi, Yokohama (JP); Kaori Murase, Yokohama (JP)

(73) Assignee: Hitachi, Ltd., Tokyo (JP)

( * ) Notice: Subject to any disclaimer, the term of this patent is extended or adjusted under 35 U.S.C. 154(b) by 696 days.

(21) Appl. No.: 13/881,063

(22) PCT Filed: Jan. 24, 2011

(86) PCT No.: PCT/JP2011/051176
§ 371 (c)(1),
(2), (4) Date: Jun. 14, 2013

(87) PCT Pub. No.: WO2012/056731
PCT Pub. Date: May 3, 2012

(65) Prior Publication Data
US 2013/0275975 A1    Oct. 17, 2013

(30) Foreign Application Priority Data
Oct. 27, 2010    (JP) .................................. 2010-240261

(51) Int. Cl.
*G06F 9/455* (2006.01)
*G06F 9/50* (2006.01)
*G06F 9/445* (2006.01)

(52) U.S. Cl.
CPC ............. *G06F 9/45533* (2013.01); *G06F 8/61* (2013.01); *G06F 9/45558* (2013.01); *G06F 9/5077* (2013.01); *G06F 2009/45562* (2013.01)

(58) Field of Classification Search
None
See application file for complete search history.

(56) References Cited

U.S. PATENT DOCUMENTS

| | | | |
|---|---|---|---|
| 7,577,722 B1 * | 8/2009 | Khandekar | G06F 9/45558 709/220 |
| 8,078,728 B1 * | 12/2011 | Pollan | G06F 9/5077 709/223 |
| 2004/0194061 A1 | 9/2004 | Fujino | |
| 2005/0172040 A1 | 8/2005 | Hashimoto | |
| 2006/0069594 A1 | 3/2006 | Yamasaki | |
| 2007/0094396 A1 | 4/2007 | Takano et al. | |
| 2007/0106798 A1 | 5/2007 | Masumitsu et al. | |
| 2012/0096457 A1 * | 4/2012 | Gupta | G06F 9/45558 718/1 |

FOREIGN PATENT DOCUMENTS

| | | |
|---|---|---|
| JP | 2005-293561 A | 10/2005 |
| JP | 2006-018561 A | 1/2006 |
| JP | 2007-114983 A | 5/2007 |
| JP | 2007-133654 A | 5/2007 |
| JP | 2010-191567 A | 9/2010 |

* cited by examiner

*Primary Examiner* — Abdullah Al Kawsar
(74) *Attorney, Agent, or Firm* — Mattingly & Malur, PC

(57) ABSTRACT

It is provided a resource management server comprising: a resource management module for managing virtual machines and use amounts of resources used by the virtual machines for deployment; a pool management module for managing a total amount of the resources and a total amount of available resources; a requirement specification reception module for receiving an allocation requirement for a new virtual machine along with requirement specifications including amounts of resources; and a search module for searching the virtual machines for deployment included in the resource management information for virtual machines for deployment having amounts of resources that satisfy the requirement specifications, and for virtual machines for deployment which do not have the amounts of resources that satisfy the requirement specifications but which allow the amounts of resources that satisfy the requirement specifications to be secured by adding the available resources included in the pool management information.

15 Claims, 29 Drawing Sheets

| 200 | HYPERVISOR IDENTIFIER | VM IDENTIFIER | CPU | MEMORY | VM STATUS | VM IMAGE | USER |
|---|---|---|---|---|---|---|---|
| 211 | HV1 | VM1 | 2GHz | 2GB | ALLOCATED | AP SERVER | USER 2 |
| 212 | HV1 | VM2 | 4GHz | 4GB | DEPLOYED | DB SERVER | --- |
| 213 | HV2 | VM3 | 6GHz | 4GB | DEPLOYED | DB SERVER | --- |
| 214 | HV2 | VM4 | 8GHz | 6GB | ALLOCATED | WEB SERVER | USER 3 |
| 215 | HV3 | VM5 | 4GHz | 4GB | ALLOCATED | AP SERVER | USER 3 |
| | | | | | | | |
| | 201 | 202 | 203 | 204 | 205 | 206 | 207 |

HYPERVISOR CONFIGURATION TABLE

*Fig. 2*

| 300 | HYPERVISOR IDENTIFIER | RESOURCE POOL IDENTIFIER | RESOURCE TYPE | TOTAL CAPACITY | AVAILABLE CAPACITY |
|---|---|---|---|---|---|
| 311 | HV1 | RP1 | CPU | 8GHz | 2GHz |
| 312 | HV1 | RP1 | MEMORY | 8GB | 2GB |
| | HV2 | RP2 | CPU | 16GHz | 2GHz |
| | HV2 | RP2 | MEMORY | 12GB | 2GB |
| 315 | HV3 | RP3 | CPU | 16GHz | 12GHz |
| 316 | HV3 | RP3 | MEMORY | 12GB | 8GB |
| | | | | | |
| | 301 | 302 | 303 | 304 | 305 |

VM POOL INFORMATION TABLE

*Fig. 3*

| USER | REQUIREMENT SPECIFICATIONS | | | ALLOCATION STATUS | | REQUIREMENT DATE/TIME |
|---|---|---|---|---|---|---|
| | VM IMAGE | CPU | MEMORY | ALLOCATION SOURCE | CHANGE | |
| USER2 | WEB SERVER | 2GHz | 2GB | DEPLOYED | YES | 2010/4/1 |
| | | | | | | 8:00:00 |
| USER3 | WEB SERVER | 8GHz | 6GB | DEPLOYED | NO | 2010/4/10 |
| | | | | | | 8:15:00 |
| USER3 | AP SERVER | 4GHz | 4GB | AVAILABLE RESOURCE | NEW | 2010/4/12 |
| | | | | | | 7:45:00 |
| USER1 | DB SERVER | 6GHz | 4GB | DEPLOYED | NO | 2010/4/14 |
| | | | | | | 8:00:00 |

LOG INFORMATION TABLE

USAGE INFORMATION TABLE

| USER | REQUIREMENT SPECIFICATIONS | | | NUMBER OF ALLOCATIONS | | | DEPLOYMENT | |
|---|---|---|---|---|---|---|---|---|
| | VM IMAGE | CPU | MEMORY | DEPLOYED WITHOUT CHANGE | DEPLOYED WITH CHANGE | NEW | USAGE | SPECIFICATIONS |
| USER2 | WEB SERVER | 2GHz | 1GB | 0 | 0 | 1 | 1 | - |
| USER2 | WEB SERVER | 2GHz | 2GB | 0 | 1 | 0 | 2 | * |
| USER2 | AP SERVER | 2GHz | 2GB | 2 | 1 | 1 | 9 | * |
| USER2 | DB SERVER | 2GHz | 2GB | 2 | 1 | 1 | 9 | * |
| USER3 | WEB SERVER | 8GHz | 6GB | 1 | 1 | 1 | 6 | * |
| USER3 | AP SERVER | 4GHz | 4GB | 0 | 0 | 1 | 1 | * |
| USER1 | DB SERVER | 6GHz | 4GB | 0 | 1 | 1 | 3 | * |

| USER | REQUIREMENT SPECIFICATIONS ||| ALLOCATION STATUS |||| REQUIREMENT DATE/TIME | START DATE/TIME |
| | VM IMAGE | CPU | MEMORY | VIRTUAL MACHINE | OCCUPANCY | ALLOCATION SOURCE | CHANGE | | |
| --- | --- | --- | --- | --- | --- | --- | --- | --- | --- |
| USER 2 | WEB SERVER | 2GHz | 2GB | VM1 | 25% | DEPLOYED | YES | 2010/4/1 8:00:00 | 2010/4/2 8:00:00 |
| USER 3 | WEB SERVER | 8GHz | 6GB | VM4 | 50% | DEPLOYED | NO | 2010/4/10 8:15:00 | 2010/4/14 8:15:00 |
| USER 3 | AP SERVER | 4GHz | 4GB | VM5 | 33% | AVAILABLE RESOURCE | NEW | 2010/4/12 7:45:00 | 2010/4/12 8:00:00 |
| USER 1 | DB SERVER | 6GHz | 4GB | VM3 | 75% | DEPLOYED | YES | 2010/4/14 8:00:00 | 2010/4/14 8:00:00 |
| | | | | | | | | | |

LOG INFORMATION TABLE

USAGE INFORMATION TABLE 1600

| USER | REQUIREMENT SPECIFICATIONS | | | NUMBER OF ALLOCATIONS | | | DEPLOYMENT | | OCCUPANCY | IMMEDIACY |
|---|---|---|---|---|---|---|---|---|---|---|
| | VM IMAGE | CPU | MEMORY | DEPLOYED WITHOUT CHANGE | DEPLOYED WITH CHANGE | NEW | USAGE | SPECIFI-CATIONS | | |
| USER 2 | WEB SERVER | 2GHz | 1GB | 0 | 0 | 1 | 1 | - | LOW | LOW |
| USER 2 | WEB SERVER | 2GHz | 2GB | 0 | 1 | 0 | 2 | * | LOW | LOW |
| USER 2 | AP SERVER | 2GHz | 2GB | 2 | 1 | 1 | 9 | * | LOW | LOW |
| USER 2 | DB SERVER | 2GHz | 2GB | 2 | 1 | 1 | 9 | * | LOW | LOW |
| USER 2 | WEB SERVER | 8GHz | 6GB | 1 | 1 | 1 | 6 | * | INTERMEDIATE | LOW |
| USER 3 | AP SERVER | 4GHz | 4GB | 0 | 0 | 1 | 1 | * | LOW | INTERMEDIATE |
| USER 1 | DB SERVER | 6GHz | 4GB | 0 | 1 | 1 | 3 | * | HIGH | HIGH |

901 902 903 904 905 906 907 908 909 1601 1602

2000

| CRITERION | ITEM | HIGH | INTERMEDIATE | LOW |
|---|---|---|---|---|
| ☐ | USAGE | 3 | 2 | 1 |
| ☐ | OCCUPANCY | 75 % OR MORE | 30 % OR MORE | 30 LESS THAN % |
| ☐ | IMMEDIACY | 15 MINUTES OR LESS | 240 MINUTES OR LESS | 240 MINUTES OR MORE |

LEVEL OPTIONS 2011
2012
2013

CANCEL    APPLY

HYPERVISOR CONFIGURATION TABLE

| HYPERVISOR IDENTIFIER | VM IDENTIFIER | CPU | MEMORY | VM STATUS | DEDICATED | CLUSTER | DIFFER-ENCING DISK | VM IMAGE | USER |
|---|---|---|---|---|---|---|---|---|---|
| HV1 | VM1 | 2GHz | 2GB | ALLOCATED | | VM6 | ○ | AP SERVER | USER2 |
| HV1 | VM2 | 4GHz | 4GB | DEPLOYED | | | | DB SERVER | — |
| HV2 | VM3 | 6GHz | 4GB | DEPLOYED | | | | DB SERVER | — |
| HV2 | VM4 | 8GHz | 6GB | ALLOCATED | ○ | | | WEB SERVER | USER3 |
| HV3 | VM5 | 4GHz | 4GB | ALLOCATED | | VM1 | | AP SERVER | USER3 |
| HV4 | VM6 | 2GHz | 2GB | ALLOCATED | | | ○ | AP SERVER | USER2 |
| HV4 | VM7 | 6GHz | 4GB | DEPLOYED | | | | DB SERVER | — |
| HV5 | VM8 | 6GHz | 4GB | DEPLOYED | | | | DB SERVER | — |
| HV5 | VM9 | 6GHz | 4GB | DEPLOYED | | | | DB SERVER | — |
| HV6 | VM10 | 6GHz | 4GB | DEPLOYED | | | | DB SERVER | — |
| HV6 | VM11 | 6GHz | 4GB | DEPLOYED | | | | DB SERVER | — |

Fig. 22

VM POOL INFORMATION TABLE

| | HYPERVISOR IDENTIFIER | VM IDENTIFIER | CURRENT SPECIFICATIONS | | | VM STATUS | CHANGE | DEDICATED STATUS |
|---|---|---|---|---|---|---|---|---|
| | | | VM IMAGE | CPU | MEMORY | | | |
| ☑ | HV5 | VM8 | DB SERVER | 6GHz | 4GB | DEPLOYED | NO | UNDETERMINED |
| ⊟ | *HV5* | *VM9* | *DB SERVER* | *6GHz* | *4GB* | *DEPLOYED* | *NO* | *UNDETERMINED* |
| ☐ | HV6 | VM10 | DB SERVER | 6GHz | 4GB | DEPLOYED | NO | UNDETERMINED |
| ☐ | HV6 | VM11 | DB SERVER | 6GHz | 4GB | DEPLOYED | NO | UNDETERMINED |

*Fig. 26*

| | HYPERVISOR IDENTIFIER | VM IDENTIFIER | CURRENT SPECIFICATIONS ||| VM STATUS | CHANGE | DEDICATED STATUS | DIFFERENCING DISK |
| | | | VM IMAGE | CPU | MEMORY | | | | |
|---|---|---|---|---|---|---|---|---|---|
| ☑ | HV5 | VM8 | DB SERVER | 6GHz | 4GB | DEPLOYED | NO | UNDETERMINED | ☑ |
| ⊕ | *HV5* | *VM9* | *DB SERVER* | *6GHz* | *4GB* | *DEPLOYED* | *NO* | *UNDETERMINED* | ⊕ |
| ☐ | HV6 | VM10 | DB SERVER | 6GHz | 4GB | DEPLOYED | NO | UNDETERMINED | ☐ |
| ☐ | HV6 | VM11 | DB SERVER | 6GHz | 4GB | DEPLOYED | NO | UNDETERMINED | ☐ |

Fig. 27

| | | CLUSTER 1 SIDE | | | | | | | CLUSTER 2 SIDE | | | | | | | |
|---|---|---|---|---|---|---|---|---|---|---|---|---|---|---|---|---|
| | HYPERVISOR IDENTIFIER | VM IDENTIFIER | CURRENT SPECIFICATIONS | | | VM STATUS | CHANGE | DEDICATED STATUS | 1 | | 2 | | 3 | | 4 | DIFFERENCING DISK |
| # | | | VM IMAGE | CPU | MEMORY | | | | HV5 | VM8 | HV5 | VM9 | HV6 | VM10 | HV6 VM11 | |
| 1 | HV5 | VM8 | DB SERVER | 6GHz | 4GB | DEPLOYED | NO | UNDETERMINED | × | | - | | ⊟ | | ⊟ | ☑ |
| 2 | HV5 | VM9 | DB SERVER | 6GHz | 4GB | DEPLOYED | NO | UNDETERMINED | - | | × | | ☑ | | □ | □ |
| 3 | HV6 | VM10 | DB SERVER | 6GHz | 4GB | DEPLOYED | NO | UNDETERMINED | ⊟ | | ⊟ | | × | | - | □ |
| 4 | HV6 | VM11 | DB SERVER | 6GHz | 4GB | DEPLOYED | NO | UNDETERMINED | ⊟ | | □ | | - | | × | □ |

LOG INFORMATION TABLE

| USER | REQUIREMENT SPECIFICATIONS | | | ALLOCATION STATUS | | | | REQUIREMENT DATE/TIME | START DATE/TIME | NUMBER OF MACHINES | OPTIONS | | |
|---|---|---|---|---|---|---|---|---|---|---|---|---|---|
| | VM IMAGE | CPU | MEMORY | VIRTUAL MACHINE | OCCUPANCY | ALLOCATION SOURCE | CHANGE | | | | DEDICATED | CLUSTER | DIFFERENCING |
| USER2 | WEB SERVER | 2GHz | 2GB | VM1 | 25% | DEPLOYED | YES | 2010/4/1 8:00:00 | 2010/4/2 8:00:00 | 1 | SHARED | YES | NO |
| USER3 | WEB SERVER | 8GHz | 6GB | VM4 | 50% | DEPLOYED | NO | 2010/4/10 8:15:00 | 2010/4/14 8:15:00 | 1 | DEDICATED | NO | NO |
| USER3 | AP SERVER | 4GHz | 4GB | VM5 | 33% | AVAILABLE RESOURCE | NEW | 2010/4/12 7:45:00 | 2010/4/12 8:00:00 | 1 | SHARED | NO | NO |
| USER1 | DB SERVER | 6GHz | 4GB | VM3 | 75% | DEPLOYED | YES | 2010/4/14 8:00:00 | 2010/4/14 8:00:00 | 2 | SHARED | YES | YES |
| USER1 | DB SERVER | 6GHz | 4GB | VM7 | 75% | DEPLOYED | YES | 2010/4/14 8:00:00 | 2010/4/14 8:00:00 | 2 | SHARED | YES | YES |
| | | | | | | | | | | | | | |

Fig. 30

USAGE INFORMATION TABLE 3000

| USER | REQUIREMENT SPECIFICATIONS | | | ALLOCATION STATUS | | | DEPLOYMENT | | OCCU-PANCY | IMME-DIACY | AVERAGE NUMBER OF MACHINES | DEDI-CATED DEGREE | CLUSTER DEGREE | DIFFER-ENCING DEGREE |
|---|---|---|---|---|---|---|---|---|---|---|---|---|---|---|
| | VM IMAGE | CPU | MEMORY | DEPLOYED WITHOUT CHANGE | DEPLOYED WITH CHANGE | NEW | USAGE | SPECIFI-CATIONS | | | | | | |
| USER2 | WEB SERVER | 2GHz | 1GB | 0 | 0 | 1 | 1 | - | LOW | LOW | 1.0 | 0% | 0% | 0% |
| USER2 | WEB SERVER | 2GHz | 2GB | 0 | 1 | 0 | 2 | * | LOW | LOW | 1.0 | 0% | 0% | 0% |
| USER2 | AP SERVER | 2GHz | 2GB | 2 | 1 | 1 | 9 | * | LOW | LOW | 1.0 | 0% | 50% | 50% |
| USER2 | DB SERVER | 2GHz | 2GB | 2 | 1 | 1 | 9 | * | LOW | LOW | 1.0 | 0% | 0% | 0% |
| USER3 | WEB SERVER | 8GHz | 6GB | 1 | 1 | 1 | 6 | * | INTER-MEDIATE | LOW | 1.0 | 100% | 0% | 0% |
| USER3 | AP SERVER | 4GHz | 4GB | 0 | 0 | 1 | 1 | * | LOW | INTER-MEDIATE | 1.0 | 0% | 0% | 0% |
| USER1 | DB SERVER | 6GHz | 4GB | 0 | 1 | 1 | 3 | * | HIGH | HIGH | 2.0 | 0% | 100% | 50% |
| | 902 | 903 | 904 | 905 | 906 | 907 | 908 | 909 | 1601 | 1602 | 3001 | 3002 | 3003 | 3004 |

RESOURCE MANAGEMENT SERVER, RESOURCE MANAGEMENT METHOD AND STORAGE MEDIUM FOR IDENTIFYING VIRTUAL MACHINES SATISFYING RESOURCE REQUIREMENTS

CROSS-REFERENCE TO RELATED APPLICATIONS

This application is the US national phase application of PCT Application PCT/JP2011/051176 filed on Jan. 24, 2011 and claims priority from Japanese Patent Application 2010-240261, filed on Oct. 27, 2010, the contents of which are hereby incorporated by reference into this application.

BACKGROUND OF THE INVENTION

This invention relates to a resource management technology for managing pooled computer resources. In particular, this invention relates to a resource allocation technology for allocating resources matching user's requirements from the pooled computer resources.

There have been known resource management technologies for pooling and operating computer resources. The computer resources include, for example, a CPU, a memory, and a hard disk drive included in a computer. In general, one physical computer is controlled to execute a plurality of virtual machines (VMs), and each of the virtual machines uses a part of computer resources of the physical computer. The computer resources are allocated depending on the execution of the virtual machines. For example, when the CPU includes four cores, one core is allocated to a virtual machine. At this time, the remaining three cores are managed as a computer pool until the other virtual machines are executed. The computer resources are managed by virtualization software for implementing the virtual machines. The virtualization software pools and manages the computer resources, and allocates the resources as needed when the virtual machines are executed. The user of the computer resources has a necessary amount of resources allocated from the pooled resources when needed, and when finished using the allocated resources, returns the computer resources that have been used to the computer pool. In this manner, when the computer resources are pooled, reusability of the computer resources may be increased, and use efficiency of the computer resources may be improved.

Among other the resource management technologies, pooled operation of physical computers has been widespread. The pooled operation of the physical computers is based on computer virtualization technologies. A resource provider prepares a large number of physical computers including computer virtualization software. Those physical computers constitute a computer pool. A user of the computer pool generates a virtual machine (VM) having necessary specifications in the computer pool. When the virtual machine is generated, the physical computer resources included in the computer pool are allocated to the virtual machine. When finished using the virtual machine, the user deletes the virtual machine from the physical computers. When the virtual machine is deleted, the computer resources that have been allocated to the virtual machine are returned to the computer pool.

The generation of the virtual machine is performed in the following order: deployment of the virtual machine; and activation of the virtual machine. The "deployment of the virtual machine" refers to copying an execution image of the virtual machine, which is stored in advance in a storage device (permanent storage device such as a hard disk drive), to a storage device of the physical computer on which the virtual machine operates. The "activation of the virtual machine" refers to activating, by the virtualization software, the virtual machine from the execution image of the virtual machine.

The activation of the virtual machine is generally complete in about several minutes. On the other hand, the deployment of the virtual machine generally takes about several ten minutes to several hours to complete because the processing of copying the execution image of the virtual machine takes time. A user who needs a large number of virtual machines needs to wait for a long time until the deployment of all virtual machines is complete. Therefore, there is a need to reduce the time it takes to deploy the virtual machines, and to improve the convenience of the user.

Moreover, when the execution image of the virtual machine is copied, CPUs and memories of both the source computer and the destination computer are significantly consumed. In the same manner, a network bandwidth between the computers is also significantly consumed. Therefore, there is a need to avoid copying execution images of a large number of virtual machines at once.

As related arts for reducing the time it takes to deploy the virtual machines, the following documents have been known. It should be noted that the following related arts include a technology for reducing the deployment time for the physical computers, but the technology is also applicable to the reduction of the deployment time for the virtual machines.

JP 2006-18561 A discloses optimizing the configuration of the system resource to be provided next according to the system resource provided as the hosting environment and the contents of the resource allocation request from the client.

JP 2007-114983 A discloses that the information system has the function of dynamically dividing the standby computers into the groups according to the difference between the software structure of the standby computers and the software structure required by the business system, and that in making the computer available, the standby computers grouped by the software structure are retrieved and extracted to complete the construction of the software environment quickly.

The specifications of the virtual machines required by the user are not always the same. Therefore, it is a problem to deploy the virtual machines matching the specifications required by the user as early as possible.

In the invention described in JP 2006-18561 A, a future request amount to the resources is predicted based on the analysis of the history of the resource request made by the user so that the deficiency and excess in resource amount are adjusted in advance. However, in the technology described in JP 2006-18561 A, the virtual machine is deployed only after the request is made, and no preparation is made in advance for deploying the virtual machine.

The invention described in JP 2007-114983 A discloses classifying the standby computers into groups by their software structures and retrieving the grouped standby computers to quickly construct the required software structure. In the technology described in JP 2007-114983 A, the standby computers including the software are prepared in advance to speed up the configuration of the software. However, the resource amounts required in further executing the individual applications are not adjusted.

As described above, it is a problem to deploy the specifications of the virtual machine required by the user, in particular, the resources required for the virtual machine quickly.

The representative one of inventions disclosed in this application is outlined as follows. There is provided a resource management server coupled to a plurality of physical computers via a network, for allocating a plurality of virtual machines by using resources included in the plurality of physical computers, the resource management server including: a resource management module for managing resource management information including a correspondence relationship between virtual machines for deployment implemented in the plurality of physical computers and use amounts of resources used by the virtual machines for deployment; a pool management module for managing pool management information including a correspondence relationship among the plurality of physical computers, a total amount of the resources included in the plurality of physical computers, and a total amount of available resources which are included in the plurality of physical computers and not allocated to the virtual machines; a requirement specification reception module for receiving an allocation requirement for a new virtual machine along with requirement specifications including amounts of resources required by the virtual machine that is newly required to be allocated; and a search module for searching for virtual machines that allow the amounts of resources included in the received requirement specifications to be allocated. The search module searches the virtual machines for deployment included in the resource management information for virtual machines for deployment having amounts of resources that satisfy the requirement specifications, and for virtual machines for deployment which do not have the amounts of resources that satisfy the requirement specifications but which allow the amounts of resources that satisfy the requirement specifications to be secured by adding the available resources included in the pool management information.

According to the representative embodiment of this invention, the use start time for the virtual machine corresponding to the specifications required by the user may be reduced.

BRIEF DESCRIPTION OF THE DRAWINGS

FIG. 2 is an explanatory diagram illustrating a hypervisor configuration table according to the first embodiment.

FIG. 3 is an explanatory diagram illustrating a VM pool information table according to the first embodiment.

FIG. 8 is an explanatory diagram illustrating a log information table according to the first embodiment.

FIG. 9 is an explanatory diagram illustrating a usage information table according to the first embodiment.

FIG. 15 is an explanatory diagram illustrating a log information table according to a second embodiment of this invention.

FIG. 16 is an explanatory diagram illustrating a usage information table according to the second embodiment.

FIG. 20 is an explanatory diagram illustrating a level option input screen according to the second embodiment.

FIG. 22 is an explanatory diagram illustrating a hypervisor configuration table according to the third embodiment.

FIG. 26 an explanatory diagram illustrating a search result list in a result list output screen according to the third embodiment.

FIG. 27 an explanatory diagram illustrating a search result list in a result list output screen according to the third embodiment.

FIG. 28 an explanatory diagram illustrating a search result list in a result list output screen according to the third embodiment.

FIG. 29 is an explanatory diagram illustrating a log information table according to the third embodiment.

FIG. 30 is an explanatory diagram illustrating a usage information table according to the third embodiment.

DETAILED DESCRIPTION OF THE PREFERRED EMBODIMENTS

First Embodiment

In one embodiment of this invention, a resource management server receives virtual machine requirements from a user, and presents a virtual machine satisfying the received requirements to the user. The resource management server analyzes a history of the virtual machine requirements input by the user in the past to estimate a virtual machine expected to be required in the future. Before actual requirements are input, the resource management server deploys virtual machines based on the estimation. When resource requirements are actually input from by the user, the resource management server searches the virtual machines that have already been deployed for virtual machines satisfying the requirements and presents the found virtual machines to the user. When specifications of the virtual machine input in the resource requirements are different from specifications of the virtual machines that have already been deployed, the resource management server checks whether it is possible to change the specifications of the deployed virtual machines. When it is possible to change the specifications, the resource management server adds the deployed virtual machines to a list of the virtual machines to be presented to the user. In this manner, the resource management server deploys frequently required virtual machines in advance so that the user may use the virtual machines immediately. In other words, the user does not need to wait until the deployment of the virtual machines is complete, and hence the convenience of the user is improved.

Figure 1:
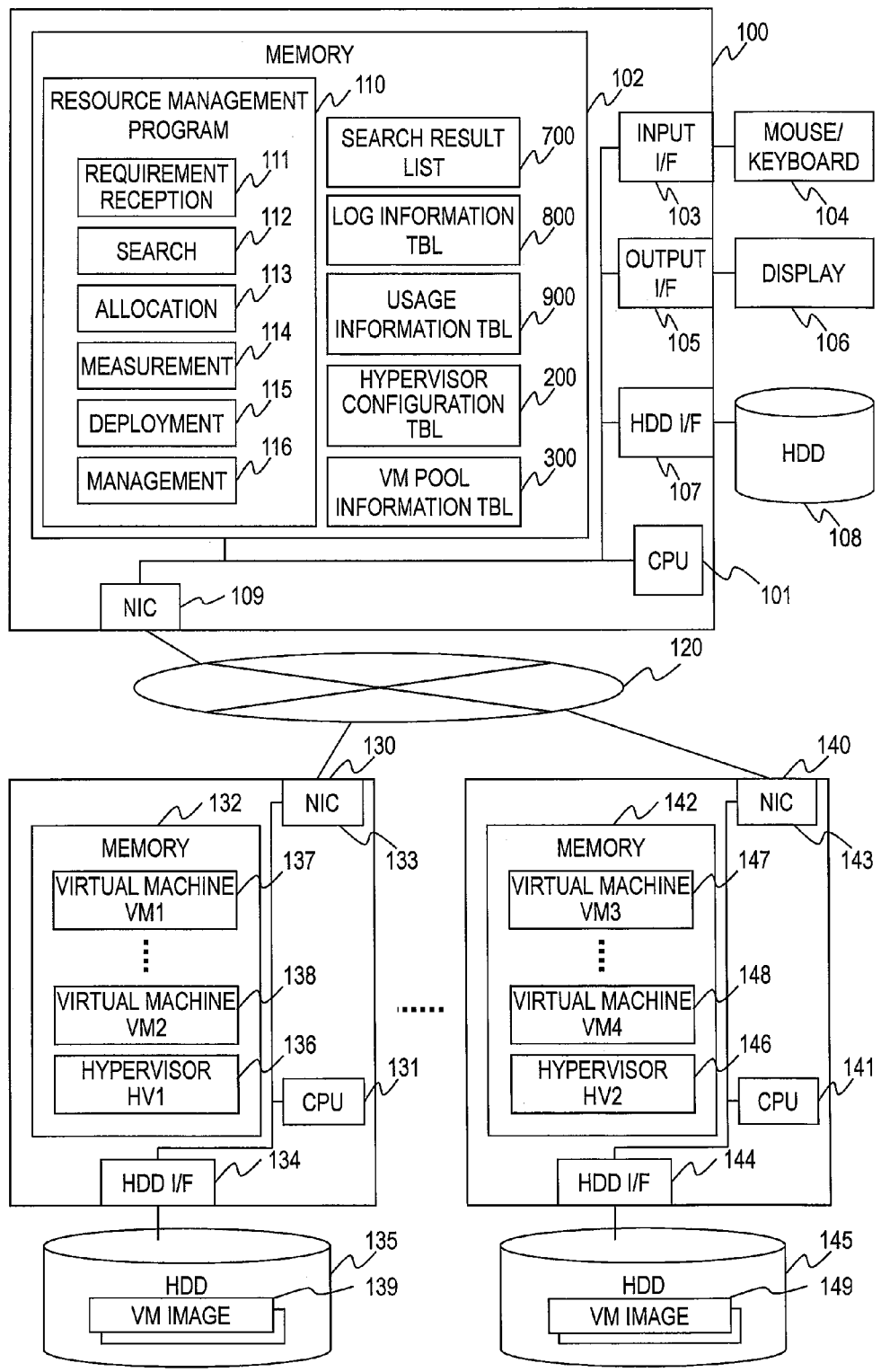
FIG. 1 is a configuration diagram illustrating an overall system according to a first embodiment of this invention.

FIG. 1 is a configuration diagram illustrating an overall system according to a first embodiment. A resource management server 100 is a physical computer and includes a CPU 101, a memory 102, a network interface card (NIC) 109, an input interface (I/F) 103, an output interface (I/F) 105, and an HDD interface (I/F) 107. The input I/F 103 of the resource management server 100 is connected to input devices such as a mouse and keyboard 104 and receives an operation from the user. The output I/F 105 is connected to an output device such as a display 106 and outputs information to the user. It should be noted that other output devices (for example, printer) are also connectable. The HDD I/F 107 is connected to a hard disk drive (HDD) 108 and stores various programs, and various data, table, and the like to be processed by the CPU 101. The NIC 109 is connected to a network 120, and to other physical computers 130 and 140 via the network 120.

A resource management program 110 is implemented in the memory 102. The resource management program 110 is generally stored in the HDD 108, and implemented by being loaded to the memory in response to a request from the CPU 101. The resource management program 110 includes subprograms for executing requirement reception processing 111, resource search processing 112, virtual machine allocation processing 113, measurement processing 114 for calculating use statuses of the virtual machines, deployment processing 115 for deploying the frequently required virtual machines in advance, and management processing 116 for collecting and managing information on the virtual machines actually allocated to the user by the other physical computers 130 and 140 and the virtual machines that have been deployed in advance from the physical computers 130 and 140. The memory 102 holds various tables such as a search result list 700 for holding information on deployable virtual machines that are found based on the requirements of the user, a log information table (log information TBL) 800 for storing the specifications and the like of the virtual machine required by the user, a usage information table (usage information TBL) 900 calculated to grasp a use tendency of the user based on the log information stored in the log information table 800, a hypervisor configuration table (hypervisor configuration TBL) 200 for holding installation statuses of the virtual machines collected from the physical computers 130 and 140, and a VM pool information table (VM pool information TBL) 300 for holding resource amounts of resources such as the CPUs and the memories mounted in the physical computers 130 and 140 and an available resource amount that is not used by the virtual machines or the like, and the resource management program 110 reads and writes from and to the tables as appropriate depending on the processing. Those tables are also stored in the HDD 108, and the CPU 101 reads the tables from the HDD 108 to be loaded to the memory 102 or stores information of the various tables on the memory 102 to the HDD 108 as needed.

The physical computer 130 is a computer having a hardware configuration similar to that of the resource management server 100, and includes a CPU 131, a memory 132, an NIC 133 for connecting to the resource management server 100 via the network, and an HDD I/F 134 for connecting to an HDD 135. Similarly, the physical computer 140 is a computer having a hardware configuration similar to that of the resource management server 100, and includes a CPU 141, a memory 142, an NIC 143, and an HDD I/F 144. Although not shown, the other input I/F 103 and output I/F 105 included in the resource management server 100 may also be included. Hypervisors 136 and 146 are loaded on the memories 132 and 142 of the physical computers 130 and 140 and perform various managements such as generation, allocation, specification change, and deletion of a plurality of virtual machines. In FIG. 1, an identifier of the hypervisor 136 of the physical computer 130 is HV1, and an identifier of the hypervisor 146 of the physical computer 140 is HV2. Each of the hypervisors 136 and 146 allocates a plurality of virtual machines on each computer. For example, a virtual machine VM1 (137) and a virtual machine VM2 (138) are allocated on the physical computer 130. A virtual machine VM3 (147) and a virtual machine VM4 (148) are allocated on the physical computer 140.

The resource management program of the resource management server 100 may transmit and receive information by communicating to and from the hypervisors 136 and 146 of the physical computers 130 and 140, and acquires allocation statuses of the virtual machines as appropriate and updates the hypervisor configuration table 200 and the VM pool information table 300. The resource management server 100 also gives an instruction to allocate a virtual machine that can handle requirements received from a user to the user, or an instruction to deploy virtual machines having frequently required specifications in advance.

The virtual machine VM1 (137) and the virtual machine VM2 (138) are virtual machines that operate on the hypervisor HV1 (136). The hypervisor HV1 (136) divides and allocates resources, for example, the CPU 131 and the memory 132 of the physical computer 130 to the virtual machines. The hypervisor HV1 (136) may also change the amount of resources to be allocated to the virtual machines. The same holds true for the physical computer 140. The HDDs 135 and 145 connected to the physical computers 130 and 140 store VM images 139 and 149, respectively. The VM image is an operation image of an operating system of a virtual machine and applications that operate on the operating system. The virtual machine mounts a virtual HDD, and loads and executes the operating system and applications stored in the virtual HDD. The VM image is an entity of the virtual HDD. The hypervisor controls the VM image used by the virtual machine so that the virtual machine may process the VM image as the virtual HDD. The VM image as the entity is one file actually stored in the HDD when viewed from the hypervisor. Therefore, one or more VM images are required for one virtual machine. For example, the virtual machine VM1 (137) on the physical computer 130 uses one VM image 139 stored in the HDD 135.

Those VM images are controlled by the hypervisor. The hypervisor may also newly generate a different virtual machine, and at that time, the hypervisor generates a VM image to be used by the new virtual machine by copying a different VM image that is already stored in the HDD. The resource management server 100 performs operations such as the instruction to generate a new virtual machine and the instruction to copy the VM image by giving instructions to the hypervisor. It should be noted that the "deployment of the virtual machines" refers to an operation in which the resource management server 100 copies the VM image 139 to the storage device (HDD 135) of the physical computer 130.

FIG. 2 illustrates the hypervisor configuration table 200. The hypervisor configuration table 200 stores allocation statuses of the virtual machines VM1 (137), VM2 (138), VM3 (147), and VM4 (148) controlled by the hypervisors HV1 (136) and HV2 (146). The allocation statuses include a hypervisor identifier 201, a VM identifier 202, a CPU 203, a memory 204, a VM status 205, a VM image 206, and a user 207. Moreover, the hypervisor configuration table 200 allocates one row to one virtual machine. The hypervisor configuration table 200 stores allocation statuses for five virtual machines that operate on the hypervisors.

First, columns of the hypervisor configuration table 200 are described. The "hypervisor identifier" column 201 stores identifiers for identifying the hypervisor HV1 (136) and the hypervisor HV2 (146) that respectively operate on the physical computers 130 and 140, and the like. Although not shown in FIG. 1, the hypervisor configuration table 200 also includes a hypervisor (HV3) of a different physical computer in a row 215. The "VM identifier" column 202 stores an identifier for identifying the virtual machine controlled on the hypervisor. A row 211 stores the identifier "VM1" for identifying the virtual machine VM1 (137) controlled by the hypervisor HV1: 136 on the physical computer 130.

The "CPU" column 203 stores a frequency of a CPU allocated to the virtual machine. In other words, this column 203 indicates one of the resource amounts allocated to the virtual machine. For example, in the case of the row 211, the column 203 indicates that the frequency of the CPU 131 in the physical computer 130 that is allocated to the virtual machine VM1 (137) is 2 GHz. In this embodiment, the CPU 131 has a frequency of 8 GHz in total capacity, which means that the frequency allocated to the virtual machine VM1 (137) is a quarter of the total capacity. In this embodiment, the column 203 indicates the frequency, but may instead indicate, for example, a number of cores of the CPU.

The "memory" column 204 stores a capacity of the memory allocated to the virtual machine. In other words, this column 204 indicates one of the resource amounts allocated to the virtual machine. For example, in the case of the row 211, the column 204 indicates that the capacity of the memory 132 in the physical computer 130 that is allocated to the virtual machine VM1 (137) is 2 GB. In this embodiment, the memory 132 has a total capacity of 8 GB, which means that the capacity of the memory allocated to the virtual machine VM1 (137) is a quarter of the total capacity.

The "VM status" column 205 stores an identifier indicating an allocation status of the virtual machine. In this embodiment, there are two types of allocation statuses: "allocated" and "deployed". The "allocated" status means that the virtual machine is already allocated to the user. The "deployed" status means that the virtual machine is not allocated to a particular user, but that the virtual machine is already deployed.

The "VM image" column 206 stores the type of the VM image used by the virtual machine. In this embodiment, there are three types of VM images: "AP server"; "DB server"; and "web server". For example, in the case of the row 211, the column 206 means that the type of the VM image used by the virtual machine VM1 (137) is an "AP server". A virtual machine VM5 in the row 215 also uses an "AP server", which does not means that the virtual machines VM1 and VM5 use the exactly same VM image, but means that the type of the VM images used is the same, and the VM images used by the virtual machines are respectively different.

The "user" column 207 stores an identifier (user ID) for uniquely identifying the user who uses the virtual machine. The virtual machines in the rows 211, 214, and 215 store user IDs for identifying the respective users. As with the virtual machines in rows 212 and 213, when the virtual machines are "deployed" but the users who use the virtual machines are not determined, a status " - - - " is stored.

FIG. 3 illustrates the VM pool information table 300. This table 300 manages the total capacities and the available capacities of the resources held by all the physical computers 130, 140, and the like managed by the resource management server 100. A "hypervisor identifier" column 301 stores an identifier for uniquely identifying the hypervisor that operates on the physical computer. As this identifier, the same identifier as that stored in the hypervisor identifier column 201 of the hypervisor configuration table 200 is used. A "resource pool identifier" column 302 is an identifier for recognizing resources included in the same physical computer. For example, an identifier "RP1" in a row 311 and the identifier "RP1" in a row 312 respectively have resources "CPU" and "memory", which means that the resources are included in the same physical computer and controlled by the same hypervisor "HV1".

A "resource type" column 303 stores information indicating types of resources managed by the resource management server 100. In this embodiment, two resources: "CPU" and "memory" are exemplified, but "NIC", which is a network I/F, "HDD", which is a hard disk drive, and the like may also be included in the resource types. A "total capacity" column 304 and an "available capacity" column 305 indicate an entire capacity included and an available capacity that is not allocated to the virtual machines, respectively, of the resource indicated by the resource type 303. For example, the total capacity "8 GHz" of the "CPU" indicated by the row 311 indicates the total capacity of the entire frequency of the CPU, and the available capacity "2 GHz" indicates an available capacity that is not allocated to the virtual machines, of the total capacity of the entire frequency of the CPU. When allocation of a virtual machine is newly requested by the user, this table 300 is used not only for searching the deployed virtual machines but also for searching whether the virtual machine is allocatable based on the available capacity written in the available capacity column 305 of this table 300.

Figure 4:
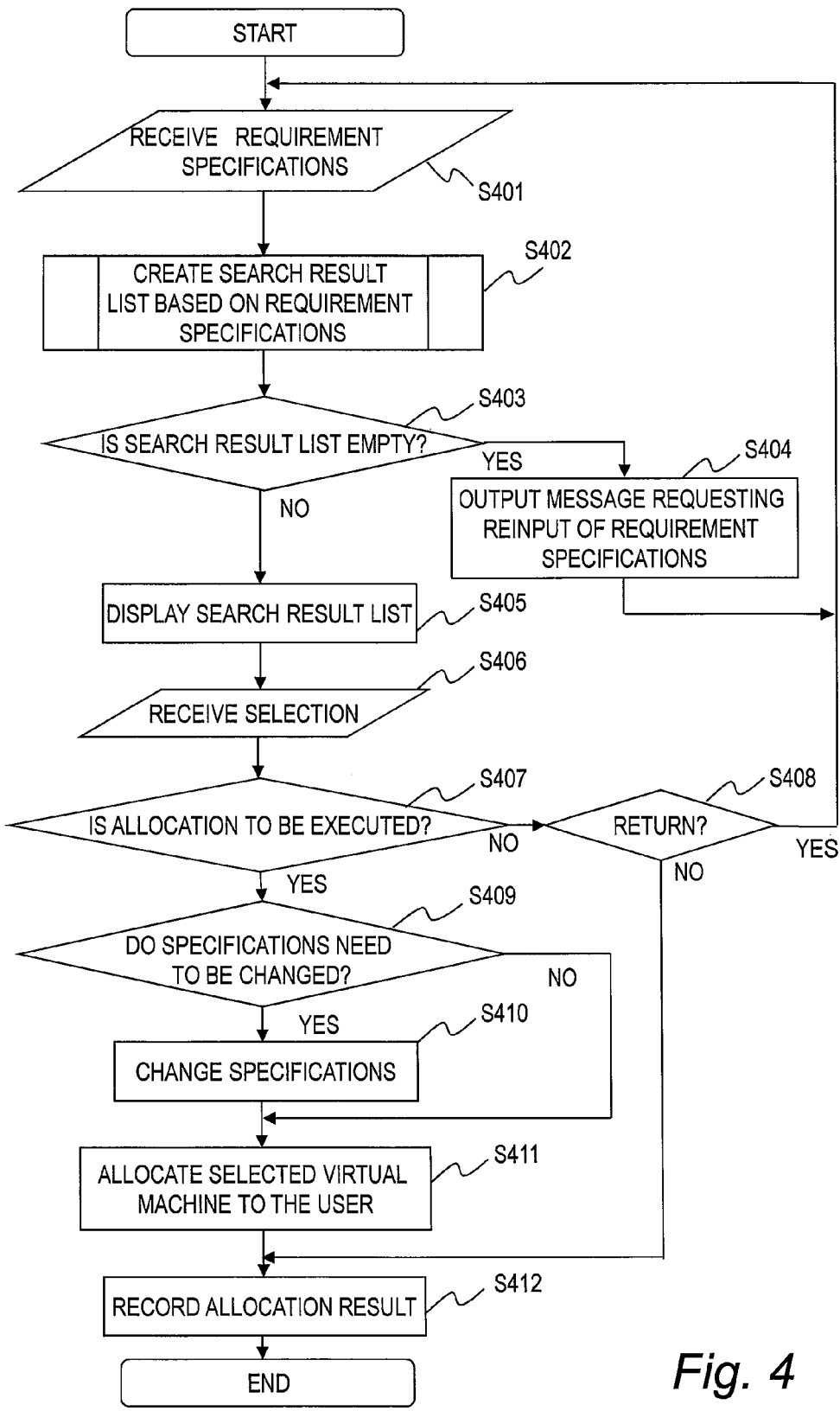
FIG. 4 is a flowchart illustrating requirement specification processing according to the first embodiment.

Referring next to FIG. 4, requirement specification processing in the first embodiment is described. FIG. 4 is a flowchart illustrating the requirement specification processing in this embodiment. The resource management program 110 illustrated in FIG. 1 executes the processing illustrated in FIG. 4.

First, the resource management program 110 displays in the requirement reception processing 111 an input screen for receiving requirements from the user and receives an input operation from the user (S401). An example of the input screen and a result of the input operation from the user is illustrated in FIG. 6.

Figure 6:
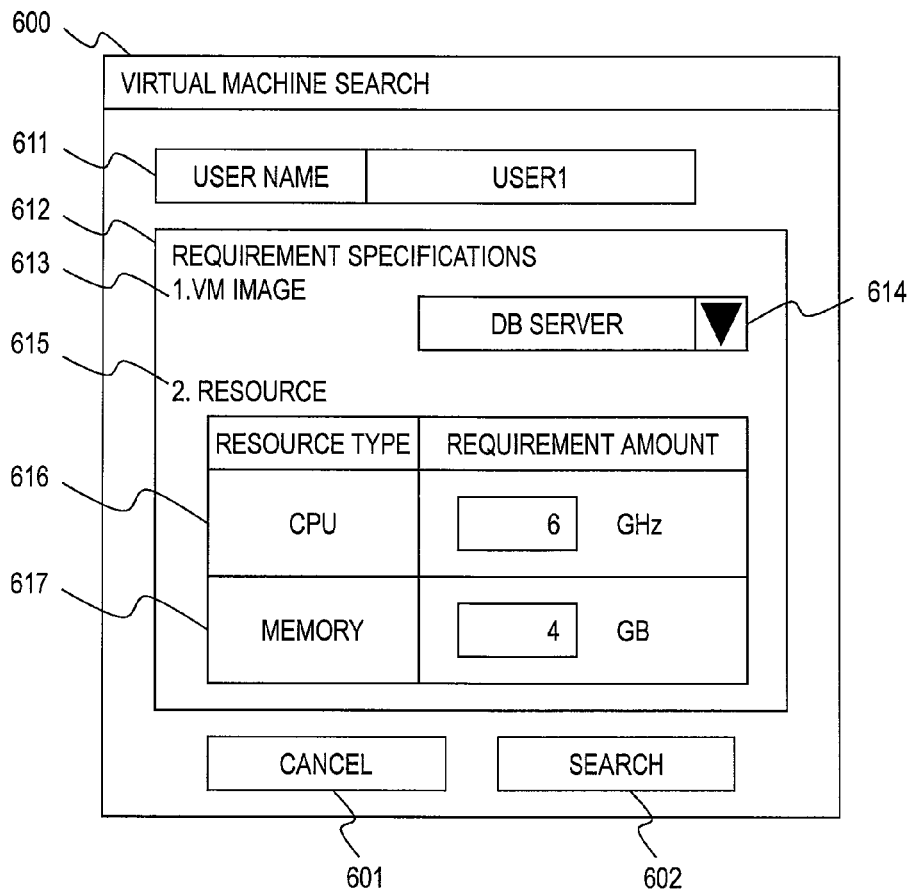
FIG. 6 is an explanatory diagram illustrating an input screen in a requirement reception processing according to the first embodiment.

FIG. 6 illustrates the example of the input screen in the requirement reception processing 111. A title shows that this screen 600 performs "virtual machine search". A user name field 611 shows a user ID, which is a user name of the user who has logged in. Although not shown in this embodiment, the resource management server 100 has a user authentication function, and the resource management program 110 uses the user ID authenticated by the user authentication function as user information. "User1" in the figure is the user ID authenticated by the user authentication function.

A "requirement specifications" field 612 is a field for specifying specifications of the virtual machine required by the user. In this embodiment, a VM image 613 and resources 615 are specified by requirement specifications. The "VM image" field 613 is used to specify a VM image required by the user from various VM images displayed by a pull-down menu 614. FIG. 6 illustrates the screen in which a VM image of "DB server" is specified. In the "resources" field 615, input fields for inputting requirement amounts required of two resource types: a CPU 616 and a memory 617 by a keyboard or the like are displayed. FIG. 6 illustrates the screen in which "6" Ghz and "4" GB are specified for the two resource types, respectively.

An input screen 600 for searching for a virtual machine displays a "cancel" button 601 and a "search" button 602. When the user operates the cancel button 601, the processing illustrated in FIG. 4 is stopped. When the user operates the search button 602, a search for allocatable virtual machines is started based on the requirement specifications specified by the user.

Figure 5:
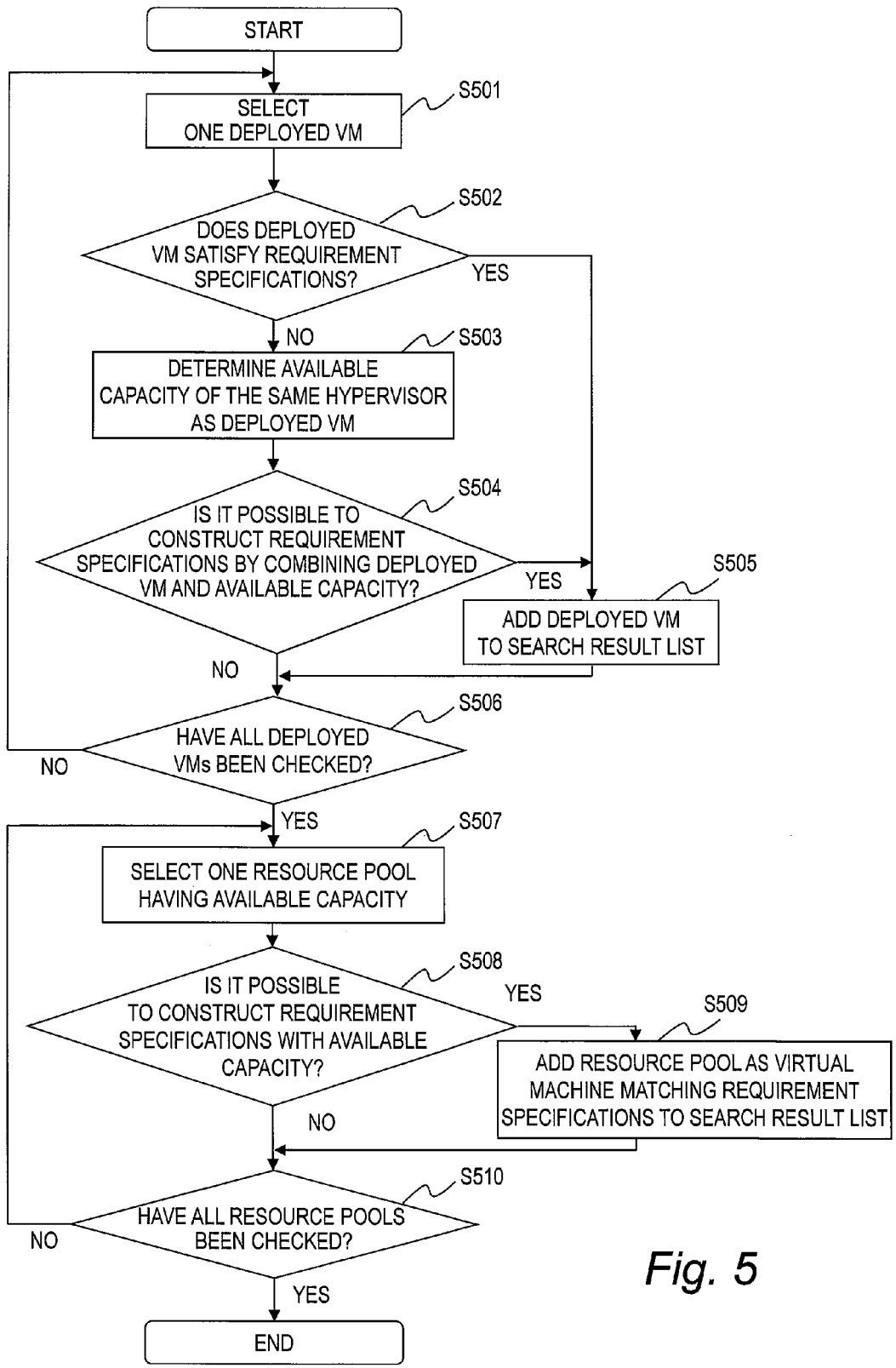
FIG. 5 is a flowchart illustrating search result list creating processing according to the first embodiment.
Figure 7:
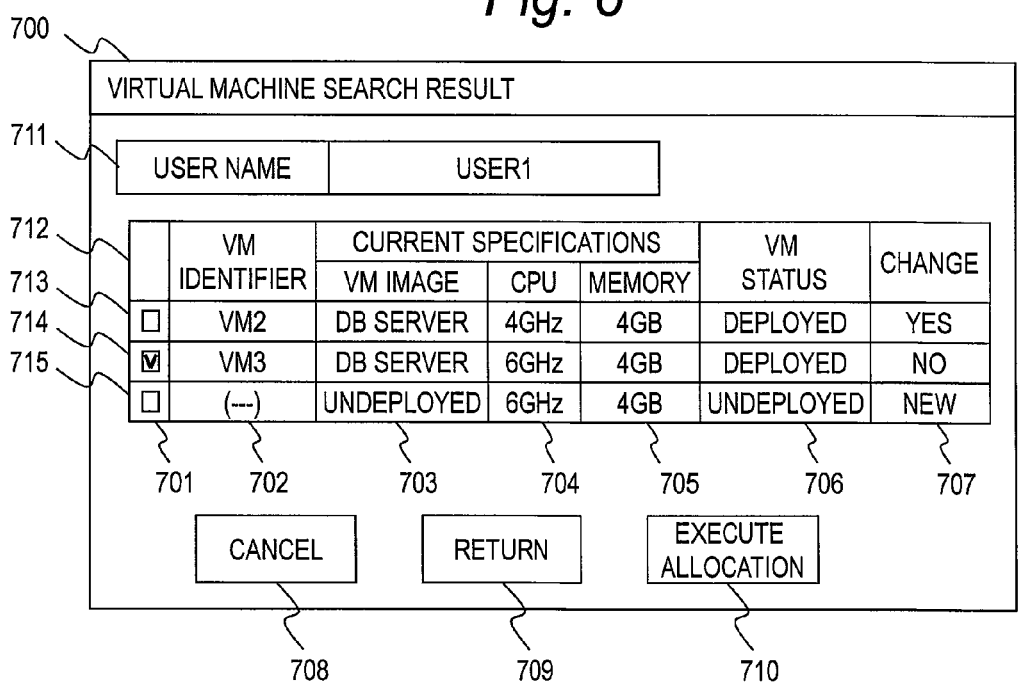
FIG. 7 is an explanatory diagram illustrating a result list output screen according to the first embodiment.

The description returns to the flowchart of FIG. 4. In the processing of receiving requirement specifications (S401) through the input screen of FIG. 6 described above, when the user inputs requirement specifications required by the user and operates the search button 602 on the input screen 600, the processing proceeds to Step S402 that follows. In Step S402, a search result list is created based on the requirement specifications input by the user. The search result list is a list showing virtual machines that satisfy the requirement specifications required by the user. A detailed flowchart of Step S402 of creating the search result list is illustrated in FIG. 5. The created search result list is illustrated in FIG. 7. The search result list is generated as a result of searching based on the requirement specifications specified by the user. Therefore, depending on the search result, a case where no virtual machine that satisfies the specifications required by the user is found is also assumed. In such case, the search result list becomes an empty list. Step S403 is a step of determining whether the search result list is an empty list. If the search result list is an empty list, the processing transitions to Step S404, in which a message for requesting the user to reinput requirement specifications is output and the processing returns to the requirement specification reception processing of Step S401. If the search result list is not an empty list in Step S403, the search result list is displayed in Step S405. The display example of the search result list is illustrated in FIG. 7.

FIG. 7 is a search result list output screen for outputting the search result list obtained as a result of searching based on the specifications required by the user. A user name field 711 shows the user who has specified the requirement specifications. A table 712 is the search result list. In FIG. 6, the user has specified a virtual machine having a VM image of the DB server, a CPU of 6 GHz, and a memory of 4 GB as the requirement specifications. The table 712 shows a result of searching based on the requirement specifications. As the result of searching, three virtual machines that match the requirement specifications are identified.

The "VM identifier" column stores identifiers of the virtual machines that match the requirement specifications. The "current specifications" column includes three columns ("VM image" column 703, "CPU" column 704, and "memory" column 705). The VM image column 703 stores an identifier for identifying the VM image held by the virtual machine. The CPU column 704 stores a frequency that can be allocated to the virtual machine. The memory column 705 stores a memory capacity that can be allocated to the virtual machine. A "VM status" column 706 indicates deployment statuses of the found virtual machines, and corresponds to the VM status column 205 of the hypervisor configuration table 200 (FIG. 2). When virtual machines that satisfy the requirement specifications are searched for, the virtual machines for which the VM status column 205 of the hypervisor configuration table 200 is "deployed" are searched. For example, the virtual machine indicated by a row 713 is the virtual machine having the VM identifier of "VM2" and has the VM status of "deployed". This row corresponds to the row 212 of the hypervisor configuration table 200.

It should be noted that as shown in the row 212 of FIG. 2, the resource amount of the CPU deployed to the virtual machine VM2 is "4 GHz" and is different from the requirement specification of "6 GHz". However, in this embodiment, the virtual machine VM2 is extracted as the search result (row 713 of FIG. 7). This is because the virtual machine VM2 may be determined to satisfy the requirement specifications by adding the available resource to the current specification that is currently deployed. The resource management program 110 refers to the VM pool information table for the available capacities of the resources related to the virtual machine VM2. As a result, the resource management program 110 finds that the CPU resource allocated to the hypervisor HV1 that controls the virtual machine VM2 has an excess of "2 GHz". The resource management program 110 determines that the requirement specification for the CPU of "6 GHz" may be realized by adding the excess of "2 GHz" to the CPU of "4 GHz" currently deployed to the virtual machine VM2. In this manner, even a deployed virtual machine that does not match the requirement specifications but satisfies the requirement specifications after operations such as allocating the available capacity of the resource are performed is extracted, and hence the number of virtual machines to be extracted as the search result may be increased, with the result that the number of options of the virtual machines that can be actually allocated may be increased for the user.

A "change" column 707 of the search result list 712 shows whether or not it is necessary to make a change such as an addition or deletion of an available resource when the deployed virtual machine is allocated. In the case of the deployed virtual machine "VM2" indicated by the row 713, in order to satisfy the requirement specifications, an operation of adding an available resource is required. When such operation of adding the available resource is required, "yes" is stored in the change column 707. When the deployed virtual machine already satisfies the requirement specifications, the operation of adding the available resource is not required, and hence the change column 707 stores "no".

A selection column 701 is a selection column for the user to select one virtual machine to be allocated from among the output virtual machines. When the user selects one field, a check mark is shown in the field to indicate the virtual machine currently specified by the user. When the user operates an "execute allocation" button 710 in the selected state, the resource management program 110 performs processing of allocating the selected virtual machine for the user.

A row 714 of the search result list 712 is a search result indicating that the virtual machine VM3, which has already been deployed, is a virtual machine that matches the requirement specifications. This is the virtual machine VM3 written in the row 213 of the hypervisor configuration table 200 illustrated in FIG. 2. The virtual machine VM3 is a virtual machine already having the same CPU frequency and memory amount as the requirement specifications. The search result list also includes deployed virtual machines that match the requirement specifications.

A row 715 of the search result list 712 indicates that it is possible to construct a virtual computer which is undeployed but matches the requirement specifications. A "VM identifier" column 702 in the row 715 stores a status "( - - - )" in which the virtual machine has not been deployed. The VM image column 703 stores "undeployed" because the VM image of the virtual machine is yet to be deployed. The VM status column 706 also stores "undeployed". The change column 707 stores "new". The status "new" indicates that when the undeployed virtual machine is selected by the user, the resource management program 110 needs to make changes such as newly deploying a virtual machine. This is because in searching the VM pool information table of FIG. 3, it has been determined from the available capacities of the CPU and the memory of the hypervisor HV3 indicated by the rows 315 and 316 that it is possible to construct a virtual machine that satisfies the requirement specifications.

The virtual machine search result screen 700 displays a "cancel" button 708, a "return" button 709, and the "execute allocation" button 710. The cancel button 708 is a button for stopping the search for the virtual machines, and the searching processing is stopped when the user operates the cancel button 708. The return button 709 is a button for displaying the input screen of the requirement reception processing illustrated in FIG. 6 again in order to execute the search again. The execute allocation button 710 is a button for actually allocating the virtual machine that the user has selected in the selection column 701 of the search result list 712. In FIG. 7, the user specifies the virtual machine indicated by the row 714 of the search result list 712 in the selection column 701. When the user operates the execute allocation button in this state, the resource management program 110 executes processing of allocating the virtual machine VM3 to the user.

The flowchart illustrating the requirement specification processing of FIG. 4 is continuously described. After the search result list 712 illustrated in FIG. 7 is displayed in Step S405, a selection is received (Step S406). At this time, the user selects one row from the selection column 701 of the search result list 712 and executes input processing of operating any one of the execute allocation button 710, the return button 709, and the cancel button 708.

Next, it is determined whether or not the button operated by the user is the execute allocation button 710 (Step S407). When the button operated by the user is the execute allocation button 710, processing of Step S409 is executed. When the button operated by the user is a button other than the execute allocation button 710, processing of Step S408 is executed. In Step S408, it is determined whether or not the operated button is the return button 709. When the button operated by the user is the return button 709, the processing returns to Step S401 to execute the processing of receiving the requirement specifications again. When the button operated by the user is not the return button 709, it is determined that the cancel button 708 is operated, and the search processing is stopped. Before stopping, processing of recording the allocation result (S412) and processing of reviewing the specifications for deployment that have already been determined may be executed.

When the button operated by the user is the execute allocation button 710, Step S409 is executed. In Step S409, one virtual machine selected by the user in the selection column 701 of the search result list 712 is identified, and it is determined whether or not the current specifications need to be changed in allocating the virtual machine. To be specific, it is determined whether or not the change column 707 of the search result list 712 is "yes" or "new". When the change column 707 of the search result list 712 is "yes" or "new", Step S410 is executed. On the other hand, when the change column 707 of the search result list 712 is "no", Step S411 is executed.

In Step S410, the specifications of the virtual machine selected by the user are changed so as to match the requirement specifications specified by the user. In FIG. 7, the user has selected the virtual machine VM3, and hence the resource management program 110 does not execute Step S410.

If the user selects the virtual machine VM2 (row 713) in FIG. 7 and operates the execute allocation button 710, in Step S410, the difference between the current specifications indicated by the row 713 of the search result list 712, that is, the VM image 703, the CPU column 704, and the memory column 705, and the requirement specifications input by the user is determined.

To be specific, it is determined that of the current specifications, the frequency of the CPU is 2 GHz short. Accordingly, in Step S410, it is determined from the row 212 of the hypervisor configuration table 200 illustrated in FIG. 2 that the hypervisor that controls the virtual machine VM2 is the hypervisor HV1, and referring to the VM pool information table 300 illustrated in FIG. 3, the available capacity column 305 in the row 311 in which the hypervisor identifier column 301 is HV1 and the resource type column 303 is CPU is referred to. In Step S410, it can be determined from the available capacity column 305 that the available capacity of the CPU is 2 GHz, and hence the hypervisor HV1 that controls the virtual machine VM2 is instructed to allocate the entire available capacity of 2 GHz to the virtual machine VM2. The hypervisor HV1 receives the allocation instruction to add the allocation of the CPU frequency to the virtual machine VM2.

If the user selects the "undeployed" virtual machine in the row 715 of the search result list 712 of FIG. 7, the difference from the requirement specifications is similarly identified, and an instruction to allocate resources is given so as to satisfy the requirement specifications. In this case, the hypervisor indicating the undeployment is HV3, and hence in S410, an instruction is given to add/change/delete the resource allocation to the hypervisor HV3. Moreover, in this case, the VM image is undeployed, and hence in Step S410, the hypervisor HV3 is instructed to copy the VM image of "DB server" held by another virtual machine so that the VM image may be used in the virtual machine for which the allocation is executed.

The processing of copying the VM image may be executed in Step S410. When the hypervisor HV3 has the VM image instructed by the virtual machine that the hypervisor HV3 controls, the hypervisor HV3 may perform the copy processing by itself. However, when the hypervisor HV3 does not have the necessary VM image, it is more efficient to execute the processing of using the VM image held by another hypervisor in Step S410. The processing of copying the VM image may be realized by file transfer processing via the network. When the hypervisor holding the required VM image operates on another physical computer, a storage address of the VM image is acquired from the hypervisor that operates on the other physical computer via the network, and the VM image at the acquired storage address is once read by the resource management server before the VM image may be transferred to the physical computer on which the virtual machine allocated to the user operates. The processing of copying the VM image may be further expanded without departing from the spirit of the subject application.

Next in Step S411, processing of allocating the selected virtual machine to the user is performed. To be specific, the resource amounts allocated to the virtual machine VM3 and the user identifier are registered (not shown) in the hypervisor configuration table 200 illustrated in FIG. 2. Moreover, the available capacity of the VM pool information table 300 illustrated in FIG. 3 is updated (not shown).

In Step S412, the result of allocation to the user in Step S411 is recorded in the log information table 800. The configuration of the log information table 800 is illustrated in FIG. 8.

The log information table 800 illustrated in FIG. 8 is a table for recording the result of allocation to the user in Step S411 as log information. The log information table 800 includes a "user" column 801, a "VM image" column 802, a "CPU" column 803, and a "memory" column 804 as the requirement specifications, an "allocation source" column 805 and a "change" column 806 as the allocation statuses, and a "requirement date/time" column 807. A row 811 indicates the result of allocating the resources based on the specifications required by the user illustrated as examples in FIGS. 6 and 7. The user column 801 stores a user ID, which is an identifier for identifying the user who has input the requirement specifications. Of the requirement specifications, the VM image column 802 stores the type of VM image specified by the user. The CPU column 803 stores the CPU frequency specified by the user. The memory column 804 stores the memory capacity specified by the user. Of the allocation statuses, the allocation source column 805 stores the status of the allocation source of the virtual machine allocated by the resource management server 100 to the user. The status "deployed" indicates that the virtual machine allocated to the user has been a "deployed" virtual machine before the requirements are received. The status "available resource" indicates that the virtual machine allocated to the user has been in the "unallocated" state before the requirements are received. In other words, when the user selects an undeployed virtual machine (row 715) in the search result list 712 of FIG. 7, the statuses of the selected virtual machine are recorded. The change column 806 stores whether in allocating the virtual machine to the user the addition/change/deletion of the resource, the processing of copying the VM image, or the like has been executed so as to satisfy the requirement specifications. When the change column 806 is "yes", it is indicated that the resource management program 110 has changed the "deployed" virtual machine so as to match the requirement specifications. When the change column 806 is "no", it is indicated that the "deployed" virtual machine matches the requirement specifications and the resource management program 110 does not need to change the "deployed" virtual machine. In the case of the status "new", it is indicated that the resource management program 110 has newly allocated a virtual machine from the "available resource". In the case of the row 811, there is no need to change, and hence the status "no" is indicated. The requirement date/time column 807 stores a date/time when the user input the requirement specifications. To be specific, the time at which the user input the requirement specifications and operated the execute allocation button 710 in the search result list output screen of FIG. 7 is stored.

As described above, it is important to record the result of actually performing the allocation processing for the user as the log information. Based on the data recorded in the log information table 800, the resource management program 110 may determine the specifications of virtual machines to be deployed in the future and provide the specifications in accordance with the requirements of the user in advance.

Figure 10:
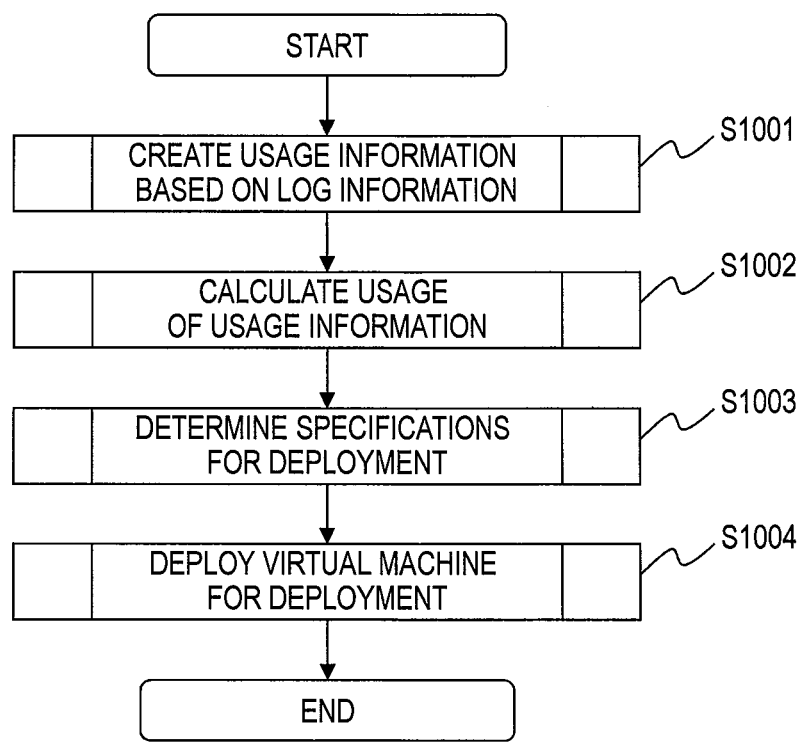
FIG. 10 is a flowchart illustrating virtual machine deployment processing according to the first embodiment.

FIG. 10 is a flowchart illustrating virtual machine deployment processing for deploying the virtual machines for deployment based on the log information table 800. In this processing, the use tendency is first analyzed based on the log information stored in the log information table 800. In this processing, the use frequency of the requirement specifications is compiled for each user from the log information table 800, and the requirement specifications having the highest use frequency are determined as the specifications of the virtual machines for deployment.

In Step S1001, usage information is first created based on the log information table 800. The usage information includes the frequency of the requirement specifications allocated by the resource management program to the user and a usage calculated from the frequency. Details of the usage information are illustrated in the usage information table 900 of FIG. 9. Details of the processing of Step S1001 are illustrated in a flowchart of the usage information creation processing of FIG. 11.

In Step S1002, the usage is calculated for each of the requirement specifications based on the usage information created in Step S1001. Also in Step S1002, the calculated usage is stored in the usage information table 900. Detailed processing of Step S1002 is illustrated in a flowchart of usage calculation processing of FIG. 12.

In Step S1003, specifications for deployment are determined based on the usage calculated in Step S1002. To be specific, in Step S1003, the requirement specifications having the highest usage are determined as the specifications for deployment for the user. Details of the processing of Step S1003 are illustrated in a flowchart of the specifications for deployment determination processing of FIG. 13.

In Step S1004, based on the specifications for deployment determined in Step S1003, the virtual machines for deployment are deployed. Detailed processing of Step S1004 is illustrated in a flowchart of deployment processing for the virtual machines for deployment of FIG. 14.

Through execution of the virtual machine deployment processing described above, the virtual machines for deployment based on the log information may be deployed in advance before the user makes a request. In addition, the frequently used requirement specifications are determined as the specifications for deployment. Therefore, in the subject application, the degree of coincidence between the specifications required by the user and the specifications of the virtual machines for deployment may be improved, and further, the frequency of changing the specifications of the virtual machines for deployment after the requirements are received may be reduced.

FIG. 9 is an explanatory diagram of the usage information table 900 for storing the usage information created in Step S1001. The usage information table 900 is used to determine the specifications for deployment of the virtual machines for deployment. The usage information table 900 holds information indicating what kinds of requirement specifications are used for each user. A "user" column 901 stores a user ID. Each piece of information stored in a "VM image" column 902, a "CPU" column 903, and a "memory" column 904, which are the requirement specifications, indicates what kind of requirement specifications the user indicated by the user ID has required in the past. For example, a row 911 indicates that "User2" has required a virtual machine having a VM image of "web server", a CPU frequency of "2 GHz", and a memory capacity of "1 GB", and that the virtual machine having the requirement specifications has allocated to the user.

A "number of allocations" column stores a frequency of allocating the virtual machine written in the requirement specifications. The number of allocations column is specifically constituted of the following three columns. A "deployed without change" column 905 stores, in allocating the virtual machine, the number of times the virtual machine is allocated without any change in specifications from the deployed virtual machines. A "deployed with change" column 906 stores the number of times the virtual machine is allocated with a change in specifications from the deployed virtual machines. A "new" column 907 stores the number of times the virtual machine is allocated from available resources that are not deployed.

A "deployment" column includes a "usage" column 908 and a "specifications" column 909. The usage column 908 stores the usage calculated based on the numbers of times stored in the number of allocations column. The specifications column 909 stores an identifier indicating that the requirement specifications having the highest usage of the calculated usages are determined as the specifications for deployment. A plurality of requirement specifications are determined for the user having the same specifications for deployment. For example, as shown in rows 912 to 914, three requirement specifications are determined as the specifications for deployment for "User2". This is because in the virtual machine deployment processing, the specifications for deployment are determined for each type of VM image. The user uses the virtual machine by changing the requirement specifications for each type of VM image. In the virtual machine deployment processing, the specifications for deployment are determined for each type of VM image so that the specifications for deployment in accordance with the requirements of the user may be deployed in advance.

Figure 11:
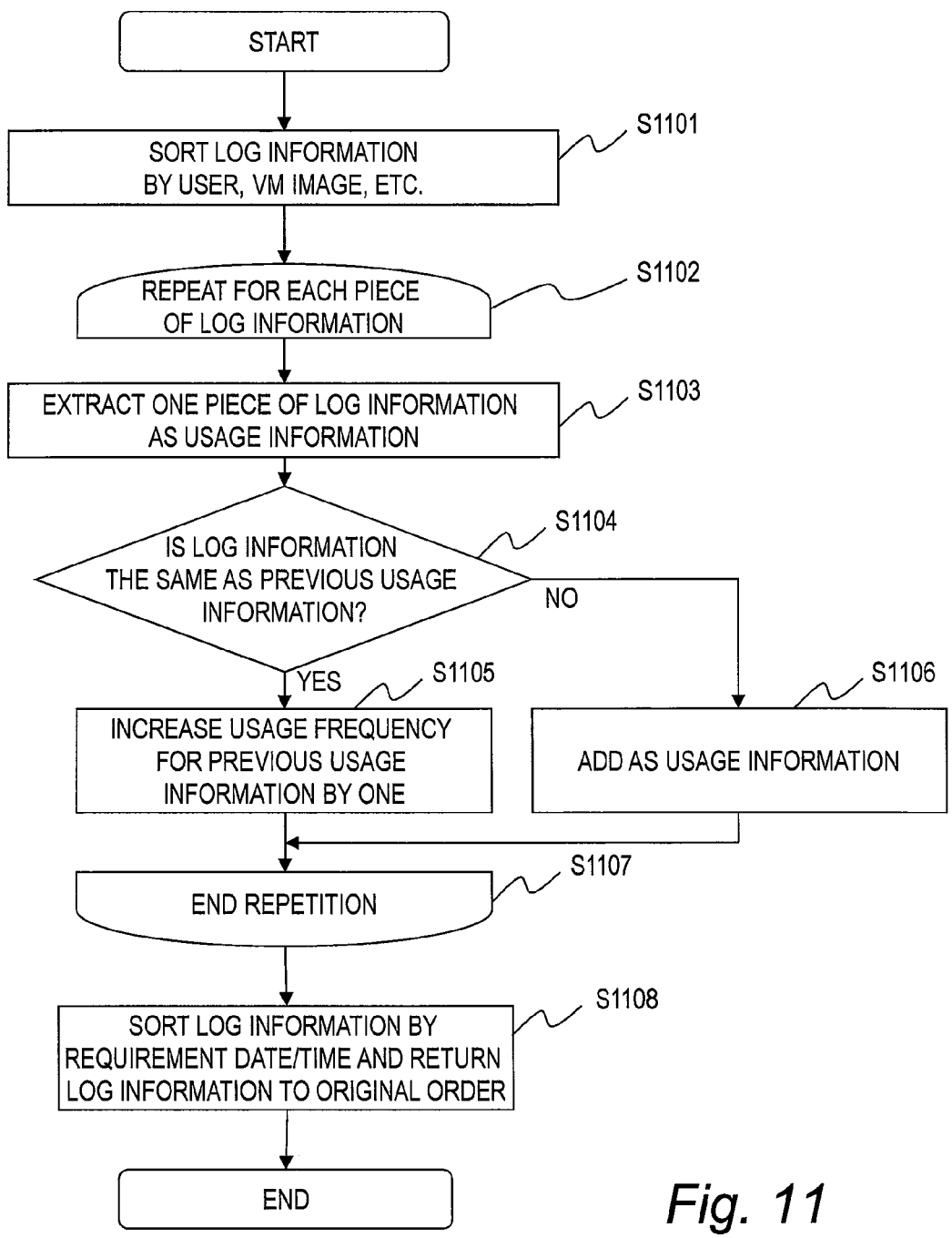
FIG. 11 is a flowchart illustrating usage information creation processing according to the first embodiment.

FIG. 11 is the flowchart illustrating the usage information creation processing. In Step S1101, the log information stored in the log information table 800 is sorted in ascending order and in the following order: the user column 801; the VM image column 802; the CPU column 803; and the memory column 804. In Step S1102, the processing up to Step S1107 is repeatedly executed until all the individual pieces of log information stored in the log information table 800 are referred to. In Step S1103, one piece of log information to be referred to is selected, and the selected piece of log information is extracted as the usage information. To be specific, one piece of sorted log information stored in the log information table 800 is selected, and one row of data of the log information table 800 is stored as the usage information in the memory.

In Step S1104, the usage information stored previously and the usage information stored this time are compared. The information to be compared includes four pieces of information respectively stored in the user column 801, the VM image column 802, the CPU column 803, and the memory column 804 of the log information table 800, and is information stored as the usage information in the memory. In Step S1104, the four pieces of information stored previously and the four pieces of information stored this time are respectively compared to determine whether or not all the pieces of information are the same. If the four pieces of information are the same therebetween, Step S1105 is executed, and if at least one piece of information is different, Step S1106 is executed. Also when the first row of the log information table 800 is stored as the usage information in the memory, in S1104, the previous usage information for comparison is not held and the comparison cannot be performed. In this case, Step S1106 is executed. In Step S1106, the four pieces of usage information stored this time are stored as new data in the usage information table 900. To be specific, one row of new data is added to the user column 901, the VM image column 902, the CPU column 903, and the memory column 904 of the usage information table 900.

In Step S1105, the four pieces of usage information stored previously and the four pieces of usage information stored this time are the same, and hence the four pieces of usage information are already stored in the usage information table 900. Therefore, the frequency is increased by +1 to the number of allocations column in the corresponding row. Which column of the number of allocations column is to be increased in frequency is determined by referring to the information stored in the allocation statuses column of the corresponding log information table 800. For example, when in the allocation statuses column the allocation source column 805 is "deployed" and the change column 806 is "no", the "deployed without change column" in the number of allocations column of the usage information table 900 is increased in frequency. As described above, the numbers of allocations are calculated based on the log information stored in the log information table 800, and the use frequency is analyzed for each of the requirement specifications of the user.

Step S1107 is a terminal of the repetition processing starting from S1102. In other words, in Step S1107, the above-mentioned steps are repetitively executed until all pieces of log information stored in the log information table 800 are referred to. In Step S1108, because the log information of the log information table 800 has been sorted by the user, the VM image, and the like in Step S1101, the original log information is returned to the original order. To be specific, the log information may be sorted in ascending order of the requirement date/time to be returned to the original order.

Through execution of the above-mentioned processing, the resource management program 110 stores information of columns 901 to 909 of the usage information table 900.

Figure 12:
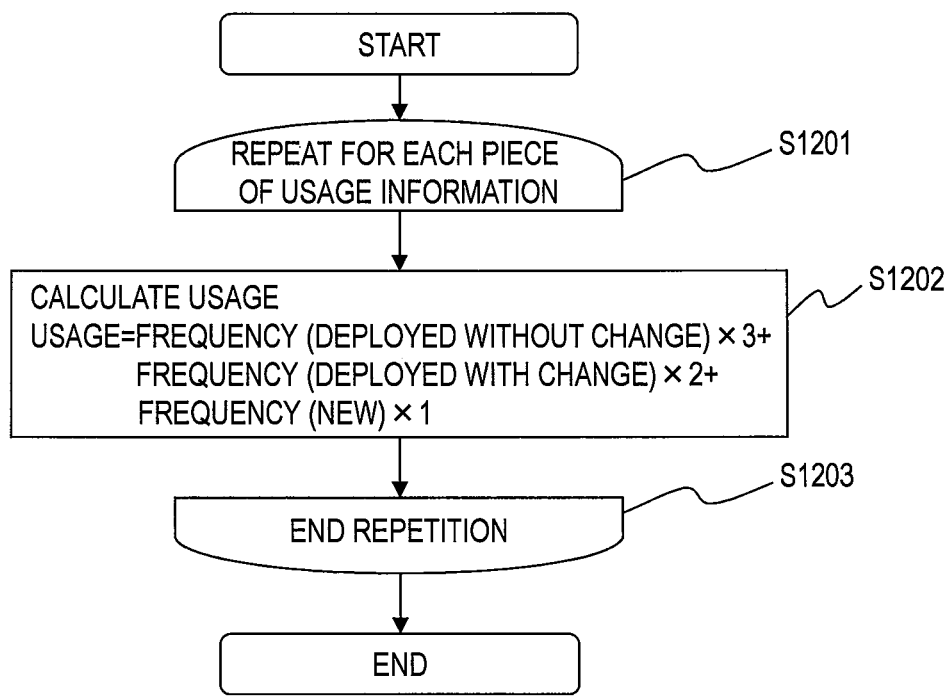
FIG. 12 is a flowchart illustrating usage calculation processing according to the first embodiment.

FIG. 12 is the flowchart illustrating the usage calculation processing, and is a flowchart illustrating Step S1002 of the flowchart of the virtual machine deployment processing of FIG. 10 in detail. In Step S1201, steps up to Step S1203 are repetitively executed until all pieces of usage information stored in the usage information table 900 are referred to. In Step S1202, one piece of usage information stored in the usage information table 900 is selected, and a usage is calculated based on the three kinds of frequencies written in the number of allocations column of the usage information table 900. In the virtual machine deployment processing, the requirement specifications having a high usage are determined as the specifications for deployment, and hence the usage is calculated by weighting each of the three kinds of frequencies. To be specific, the frequencies of the deployed without change column 905, the deployed with change column 906, and the new column 907 are multiplied by 3, 2, and 1, respectively, and the sum of the multiplied frequencies is calculated as the usage. When the proportion of weighting may be changed depending on the overall use frequency, the virtual machines more suited to the specifications required by the user may be deployed in advance. The calculated usage is stored in the usage column 908 of the usage information table 900. Step S1203 is a terminal of the repetition processing starting from S1201. Through execution of the above-mentioned processing, the resource management program 110 stores the information in the column 908 of the usage information table 900 for all pieces of usage information.

Figure 13:
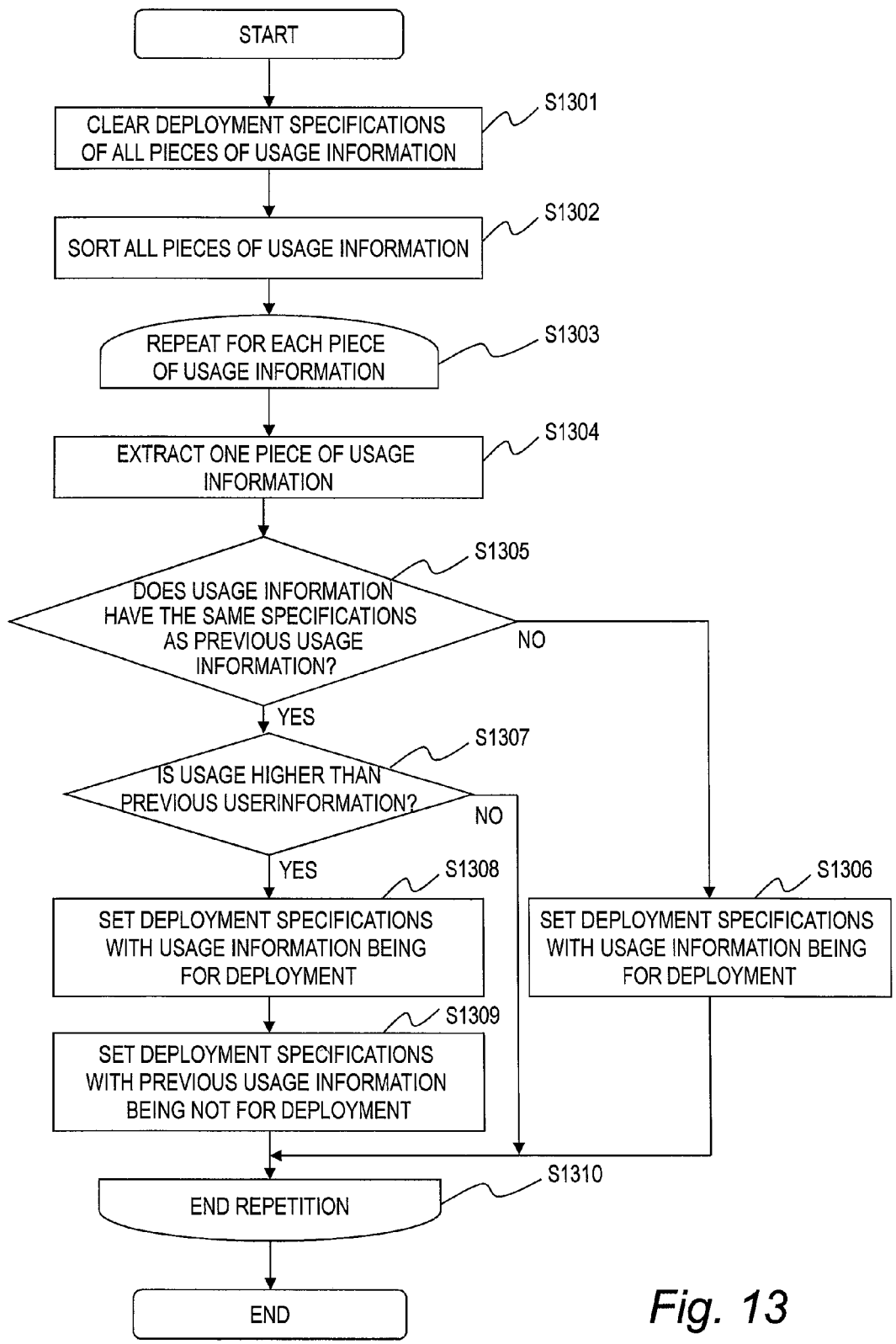
FIG. 13 is a flowchart illustrating specifications for deployment determination processing according to the first embodiment.

FIG. 13 is the flowchart illustrating the specifications for deployment determination processing, and is a flowchart illustrating Step S1003 of the flowchart of the virtual machine deployment processing of FIG. 10 in detail. In Step S1301, the determined specifications stored in the specifications column 909 of the usage information table 900 are once cleared. To be specific, the specifications column 909 is set to null for all pieces of usage information. In Step S1302, all pieces of usage information stored in the usage information table 900 are sorted in ascending order and in the following order: the user column 901; the VM image column 902; the CPU column 903; the memory column 904; and the usage column 908. In Step S1303, the steps up to S1310 are repeated until all pieces of usage information stored in the usage information table 900 are referred to. In Step S1304, one piece of usage information stored in the usage information table 900 is extracted. To be specific, two pieces of information stored in the user column 901 and the VM image column 902 are stored in the memory.

In Step S1305, the two pieces of information stored previously in the memory and the two pieces of information stored in the memory this time are respectively compared. When the usage information of the user and the VM image is the same therebetween, it is a case where the requirement specifications thereof, that is, the requirement specifications stored in the CPU column 903 and the memory column 904 are different. Therefore, the usages thereof are compared to execute Step S1307 and the following steps for determining the deployment specifications depending on the usages. If the usage information of the user and the VM image is different, Step S1306 is executed. In Step S1306, the usage information extracted this time is determined as the deployment specifications. To be specific, the identifier indicating that the usage information is determined as the deployment specifications is stored in the specifications column 909 of the usage information table 900.

Step S1307 is executed when the two pieces of information: the user and the VM image stored previously in the memory and the two pieces of information: the user and the VM image stored in the memory this time respectively match. Therefore, the previous usage information and the usage information this time are different in the resource amounts and in use frequencies of the CPU and the memory. Therefore, the usages are different. In Step S1307, the usage corresponding to the two pieces of information stored previously in the memory and the usage corresponding to the two pieces of information stored in the memory this time are compared. If the usage corresponding to the two pieces of information stored in the memory this time is higher than the usage corresponding to the two pieces of information stored previously in the memory, Step S1308 is executed. When the usage corresponding to the two pieces of information stored in the memory this time is lower, the specifications corresponding to the two pieces of information previously stored are already determined as the deployment specifications so that the determination processing for the deployment specifications does not need to be performed, and the processing proceeds to Step S1310.

In Step S1308, the usage corresponding to the two pieces of information stored in the memory this time is higher, and hence the requirement specifications corresponding to the two pieces of information are determined as the deployment specifications. To be specific, the identifier indicating that the usage information is determined as the deployment specifications is stored in the specifications column 909 of the usage information table 900. Moreover, in Step S1309, the requirement specifications corresponding to the two pieces of information stored previously in the memory are determined as not the deployment specifications. To be specific, a null value is stored in the specifications column 909 of the usage information table 900. Step S1310 is a terminal of the repetition processing starting from Step S1303.

By sequentially referring to the usage information stored in the usage information table 900 to determine the specifications for deployment as described above, the requirement specifications having the highest usage may be determined as the specifications for deployment.

Figure 14:
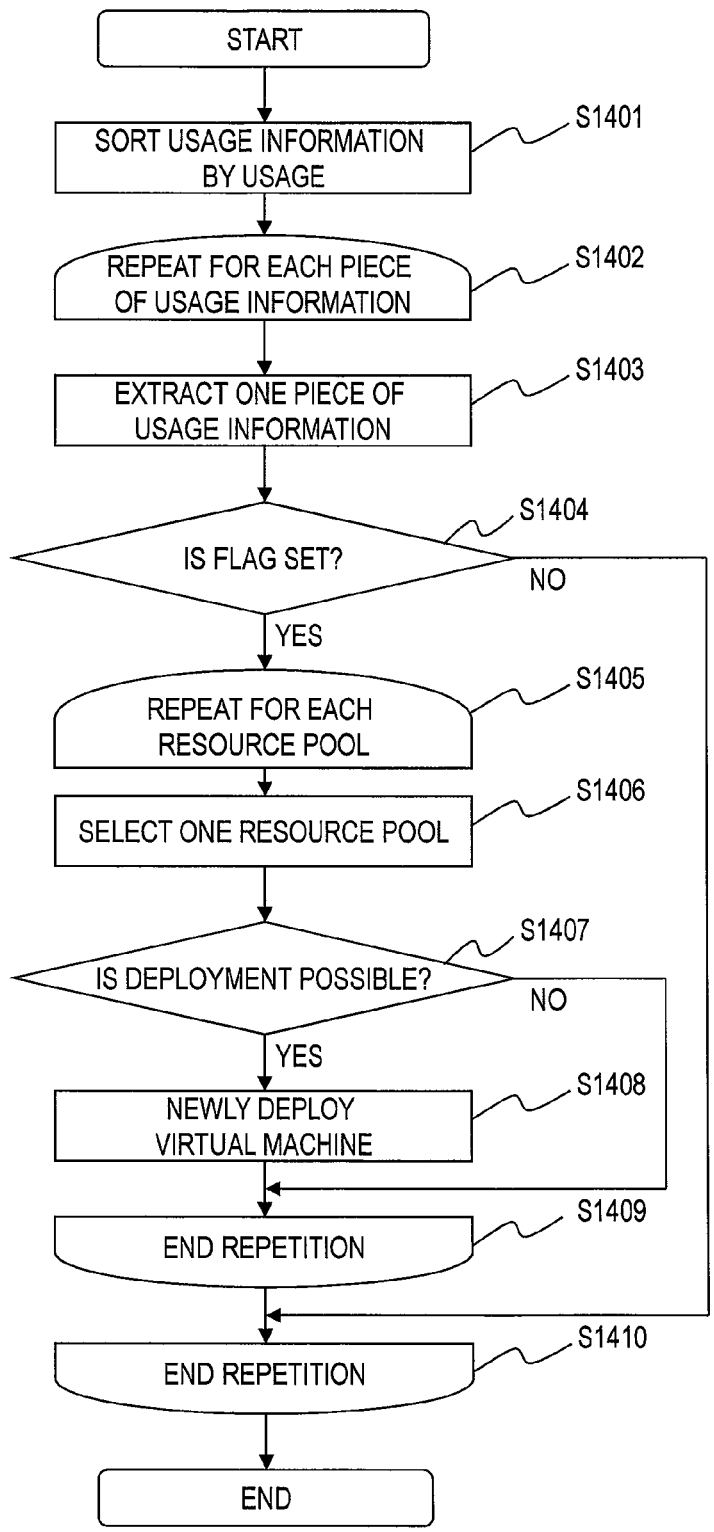
FIG. 14 is a flowchart illustrating the deployment processing for the virtual machines for deployment according to the first embodiment.

FIG. 14 is the flowchart illustrating the deployment processing for the virtual machines for deployment. This flowchart is a flowchart illustrating in detail Step S1004 of the virtual machine deployment processing of FIG. 10. Through execution of the specifications for deployment determination processing of FIG. 13, the specifications for deployment are determined for each of the requirement specifications. This flowchart illustrates the processing of deploying the virtual machines for deployment in advance using the determined specifications for deployment.

In Step S1401, the usage information stored in the usage information table 900 is sorted in descending order based on the usage stored in the usage column 908. This step is performed for the purpose of deploying the virtual machines for deployment in order from the requirement specifications having the highest usage. The virtual machines for deployment are deployed from the available resources, and hence the number of virtual machines that can be deployed is limited. In other words, it is not always the case that all the virtual machines for deployment based on the usage information determined as the specifications for deployment in the specifications column 909 of the usage information table 900 can be deployed. Therefore, there is a need to deploy the virtual machines for deployment in order from the usage information having the highest usage.

In Step S1402, the subsequent processing up to Step S1410 is repeated until all pieces of usage information stored in the usage information table 900 are referred to. In Step S1403, one piece of usage information stored in the usage information table 900 is extracted. In Step S1404, it is determined whether the identifier indicating that the usage information is determined as the specifications for deployment is stored in the specifications column 909 of the extracted piece of usage information. When the identifier is not stored, the deployment of the virtual machines based on the usage information is not necessary, and hence the processing proceeds to Step S1410. If the identifier is stored, the processing proceeds to Step S1405.

In Step S1405, the subsequent processing up to Step S1409 is repeatedly executed until all pieces of resource pool information stored in the VM pool information table 300 are referred to. In Step S1406, one piece of resource pool information stored in the VM pool information table 300 is selected. In Step S1407, the selected piece of resource pool information is used to determine whether it is possible to deploy the virtual machines having the specifications for deployment extracted in Step S1403. In Step S1407, the available capacity column 305 of the selected piece of resource pool information is referred to, and it is determined whether it is possible to deploy the virtual machines having the specifications for deployment by checking if the available capacities are larger than the resource amounts required in the specifications for deployment. When the available capacities are larger than the required resource amounts, Step S1408 is executed, and when the available capacities are smaller, the processing proceeds to Step S1409. In Step S1408, the virtual machines for deployment are deployed with the required resource amounts.

Step S1409 is a terminal of the repetition processing starting from Step S1405. Further, Step S1410 is a terminal of the repetition processing starting from Step S1402.

In this manner, the virtual machines for deployment may be deployed in advance depending on the specifications for deployment and the usage thereof, and hence the virtual machines more frequently required by the user may be deployed in advance. Moreover, the virtual machine deployment processing illustrated in FIG. 10 may be executed periodically to distribute the virtual machines for deployment in advance. Moreover, for example, the processing of determining the specifications for deployment in Steps S1001 to S1003 and the processing of deploying the virtual machines for deployment in Step S1004 may be executed at different timing.

For example, in the requirement specification processing illustrated in FIG. 4, after allocating a virtual machine based on the user requirements (Step S411) and storing the allocation result in the log information table 800 (Step S412), the processing of determining the specifications for deployment in Steps S1001 to S1003 may be executed in order to review the specifications for deployment. Moreover, other virtual machines having the same specifications as those of the virtual machine allocated to the user may be deployed as the virtual machines for deployment from the available resources. The deployment processing for the virtual machines for deployment is performed for the purpose of deploying the virtual machines matching the requirements of the user in advance as described above, and hence the virtual machines for deployment may be deployed based on the specifications for deployment, or the virtual machines for deployment may be deployed based on the specifications allocated in response to the requirements.

In the first embodiment described above, a use start time of the virtual machine corresponding to the specifications required by the user may be reduced. Moreover, the use start time may be reduced by analyzing in advance the combination tendency and the provision tendency of the virtual machines, which are use forms of the user in the past, and making preparation so that the specifications required by the user may be responded to promptly.

The processing of receiving the requirement specifications from the user and searching for the corresponding deployed virtual machines, and the processing of determining the specifications for deployment based on the log information of the allocated virtual machines and deploying the virtual machines in advance have also been described. Also in the case of searching, not only the virtual machines having the same specifications as the requirement specifications but also the virtual machines that satisfy the requirement specifications after changing the current specifications may be extracted as the search results. If there exist no virtual machines that match the requirement specifications, the user may select the virtual machines that can adapt by changing the current specifications, and hence the user may select from a larger number of virtual machines. Moreover, with the use of the log information, the specifications of the virtual machines to be deployed in advance may be set to the specifications frequently required by the user, and hence the number of selectable virtual machines may be further increased.

Second Embodiment

Next, a second embodiment of this invention is described. In the first embodiment, the usage information table 900 is created based on the log information table 800, and the use frequency is analyzed to determine the specifications for deployment. This is based on the assumption that immediately after searching for and selecting a virtual machine that satisfies the requirement specifications, the user starts using the allocated virtual machine.

The second embodiment assumes a case where there is a time lag (time difference) from the time when the virtual machine is allocated to the user to the time when the user starts using the virtual machine. A user may secure a virtual machine satisfying the requirement specifications in advance and starts using the secured virtual machine later. In particular, when a plurality of users share one physical computer, a user searches for and secures the virtual machine in advance to secure the shared resources before using the virtual machine ahead of the other users so that the user may use the virtual machine reliably. However, for a user who really wants to use the virtual machine immediately, the number of virtual machines to be allocated to the user is decreased, and hence it becomes difficult to secure and execute the virtual machine reliably.

Therefore, in the second embodiment, the date/time when the user starts using the allocated virtual machine is recorded as the log information, and based on the difference between the date/time the allocation is required and the use start date/time, it is analyzed whether or not the user has immediately used the virtual machine to calculate an immediacy. As the difference becomes smaller, the immediacy becomes higher and hence an immediacy of higher value is set, and as the difference becomes larger, the immediacy becomes lower and hence an immediacy of lower value is set. Through the calculation of the immediacy as described above, control is performed so that the virtual machines for deployment that match the specifications required by the user having a high immediacy are deployed first.

Moreover, in the second embodiment, an occupancy indicating to what extent the virtual machine allocated to the user occupies the resources of the physical computer is calculated. When the resource amount required by a user is larger than the other users, the resource management program 110 needs to secure a larger resource amount at one time. The resource amounts included in the physical computer are limited, and hence there is a need to deploy virtual machines having higher occupancy in precedence to the virtual machines having lower occupancy where possible.

In the second embodiment, a description is given of specific processing using the two factors: immediacy and occupancy. The two factors are independent of each other, and hence it is not that the two factors always need to be used to determine the specifications for deployment, and the two factors may be implemented separately.

FIG. 15 illustrates a log information table 1500 according to the second embodiment. The log information table 1500 in the second embodiment has a structure similar to that of the log information table 800 (FIG. 8) in the first embodiment. In the log information table 1500 in the second embodiment, the same columns as those of the log information table 800 in the first embodiment are denoted by the same reference numerals as those illustrated in FIG. 8 to omit the description thereof, and different portions are described below.

The following three columns are different from the log information table in the first embodiment: a "virtual machine" column 1501 and an "occupancy" column 1502 in the allocation statuses column, and a "start date/time" column 1503. The virtual machine column 1501 stores an identifier of the virtual machine selected by and allocated to the user. The occupancy column 1502 stores what proportion of the total capacities is occupied by the resource amounts indicated by the requirement specifications in terms of percentage.

For example, in the case of the log information in the first row, the CPU column 803 and the memory column 804 are 2 GHz and 2 GB, respectively. Those are resources allocated to the virtual machine VM1 indicated in the virtual machine column 1501. The resource management program 110 refers to the hypervisor configuration table 200 illustrated in FIG. 2 to identify that the hypervisor allocated to the virtual machine VM1 is "HV1", and refers to the VM pool information table 300 illustrated in FIG. 3 to identify the total capacities of the CPU and the memory of the hypervisor HV1. The resource management program 110 may calculate the occupancy based on the total capacities and the resource amounts allocated to the virtual machine VM1.

In the second embodiment, the occupancy is calculated for each resource, and the highest occupancy value is set as the occupancy of the virtual machine. For example, in the case of the log information in the first row, the CPU of the virtual machine VM1 occupies 2 GHz. In the VM pool information table 300, the total capacity of the CPU managed by the hypervisor HV1 is 8 GHz, with the result that the occupancy of the CPU is 25%. The capacity of the memory of the virtual machine VM1 is 2 GB, and the total capacity of the memory managed by the hypervisor HV1 is 8 GB, with the result that the occupancy of the memory is 25%. The occupancies of the CPU and the memory are both 25%, and hence the occupancy of the virtual machine is 25%. If the occupancy of the CPU is 50% and the occupancy of the memory is 25%, the occupancy of higher value is determined as the occupancy of the virtual machine. Therefore, in this case, the occupancy is 50%. It is more difficult to deploy and allocate the virtual machine having the higher occupancy than to deploy and allocate the virtual machine having the lower occupancy. Therefore, in the second embodiment, the occupancy is set to as high a value as possible so that even if the allocation is difficult, a case where the requirement specifications are not satisfied after allocation is avoided.

Moreover, the resources are independent of each other, and hence the occupancies may be considered separately so as to calculate and evaluate two occupancies. The difficulty in acquiring the resource may be changed for each resource. Moreover, a weighted average value obtained by weighting the occupancies and calculating an average value may be used. The weighted average value may be used to weight the occupancy of the resource that is harder to acquire more heavily so that the occupancy may be set higher.

The resource management program 110 calculates information to be stored in the virtual machine column 1501 and the occupancy column 1502 and stores the calculated information in the log information table 1500 at the same timing when the other requirement specifications, allocation statuses, and requirement date/time are stored.

The start date/time column 1503 stores the time when the user actually activated the allocated virtual machine. The virtual machine allocated to the user is controlled by the corresponding hypervisor. For example, the virtual machine VM1 written in the first row of FIG. 15 is controlled by the hypervisor HV1. The hypervisor HV1 performs execution start processing on the virtual machine VM1 based on the user requirements. The resource management program 110 may identify the start date/time by inquiring of the hypervisor HV1 via the network if the virtual machine VM1 has been started. Alternatively, the hypervisor "HV1" may notify the resource management program of the execution start of the virtual machine VM1 with the execution start of the virtual machine as a trigger. After storing the log information in the log information table 1500, the resource management program 110 starts monitoring the corresponding hypervisor, and at a time when the start date/time is identified, stores the start date/time in the corresponding start date/time column 1503. An alternative method may be to implement a function of saving the execution start processing on the virtual machine as a log in the hypervisor and to monitor for an update of the log by the resource management program 110. As described above, the date/time when the user starts using the allocated virtual machine is identified so that the immediacy may be evaluated.

FIG. 16 illustrates a usage information table 1600 according to the second embodiment. The usage information table 1600 in the second embodiment has a structure similar to that of the usage information table 900 (FIG. 9) in the first embodiment. In the usage information table 1600 in the second embodiment, the same columns as those of the usage information table 900 in the first embodiment are denoted by the same reference numerals as those illustrated in FIG. 9 to omit the description thereof, and different portions are described below. The following two columns are different from the usage information table 900 of the first embodiment: an "occupancy" column 1601 and an "immediacy" column 1602. Each column stores for each piece of usage information one of the following three levels: "high"; "intermediate"; and "low". A specific method of determining the level is described with reference to the flowcharts of FIG. 17 and the following figures.

Figure 17:
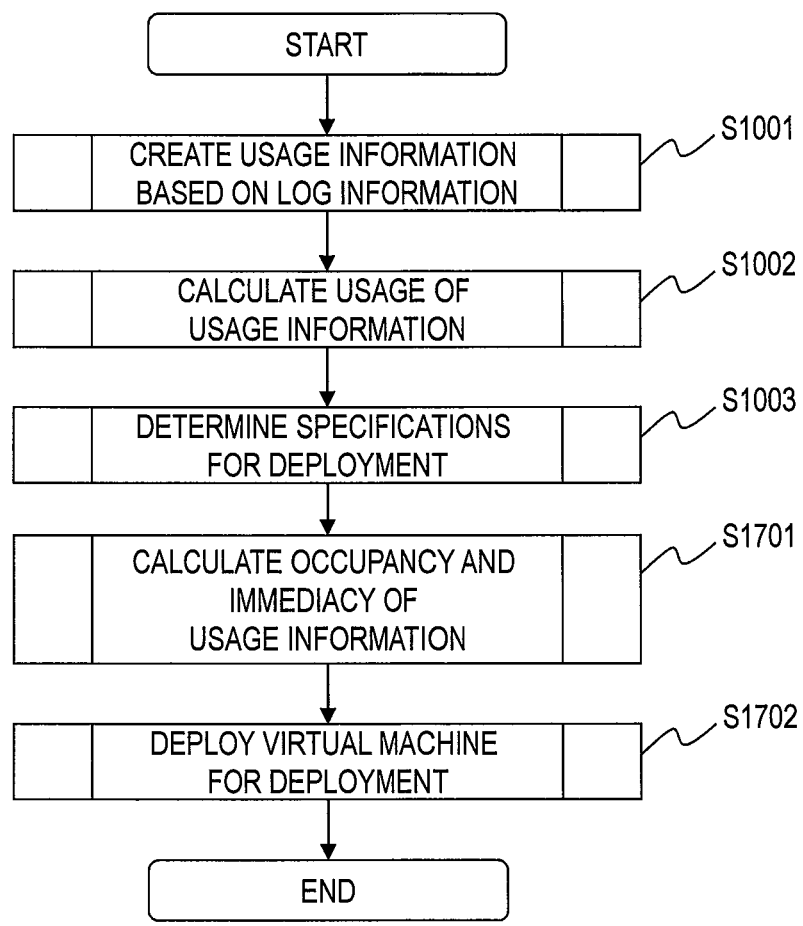
FIG. 17 is a flowchart illustrating virtual machine deployment processing according to the second embodiment.

FIG. 17 is a flowchart illustrating virtual machine deployment processing according to the second embodiment. FIG. 17 basically has the same steps as those of the flowchart of FIG. 10, and the steps performing the same processing are denoted by the same reference symbols.

Figure 18A:
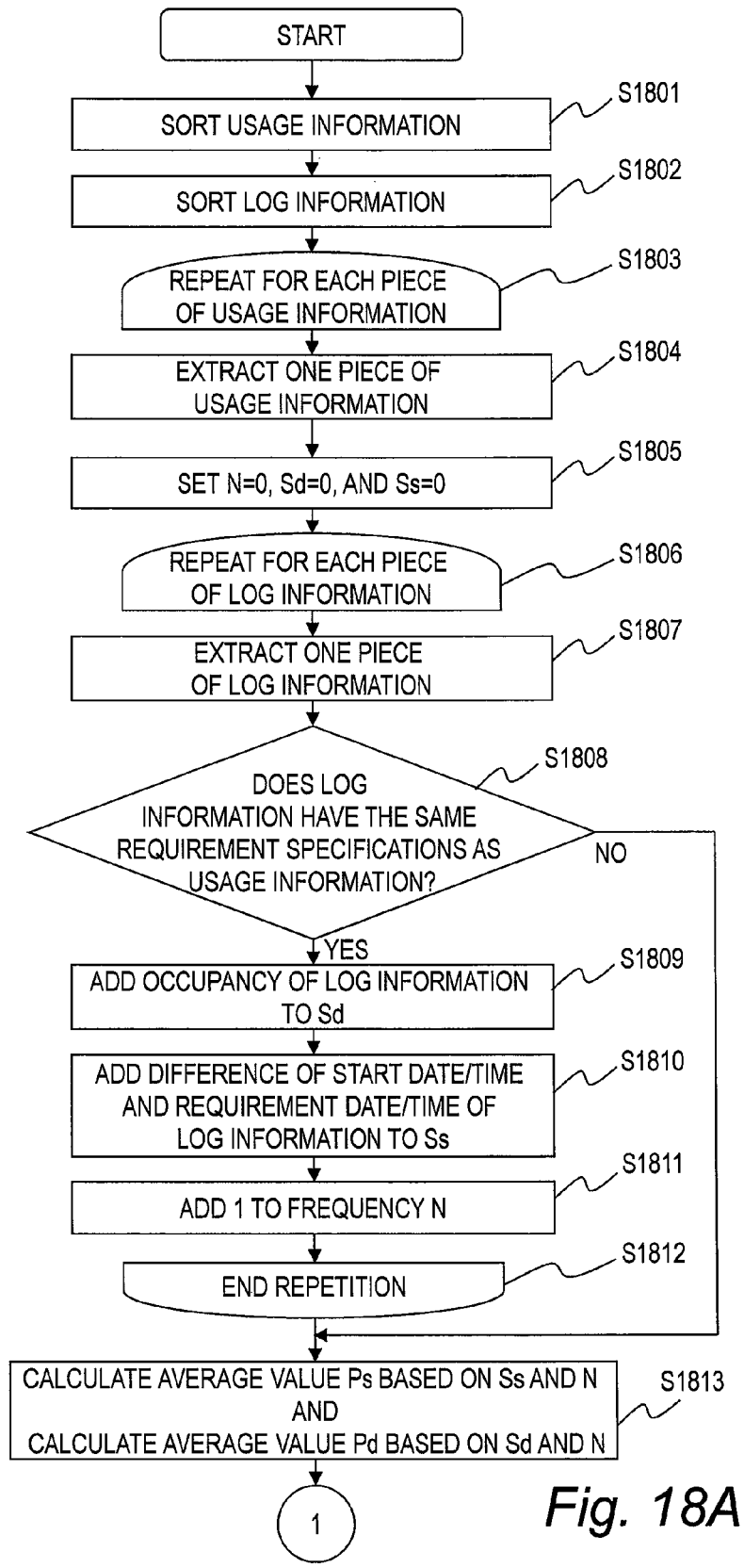
FIGS. 18A and 18B are flowcharts illustrating usage information creation processing according to the second embodiment.
Figure 18B:
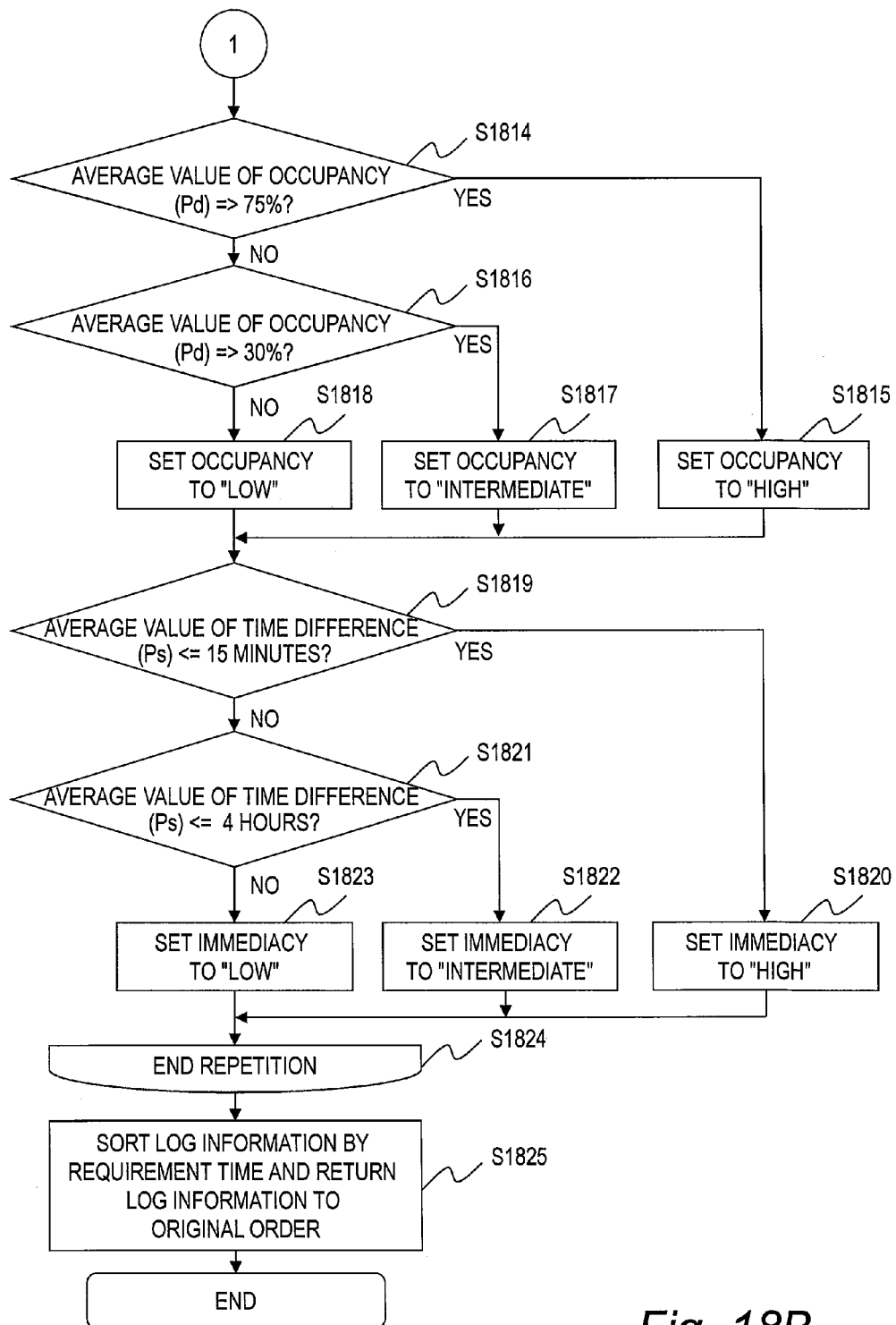
Figure 19:
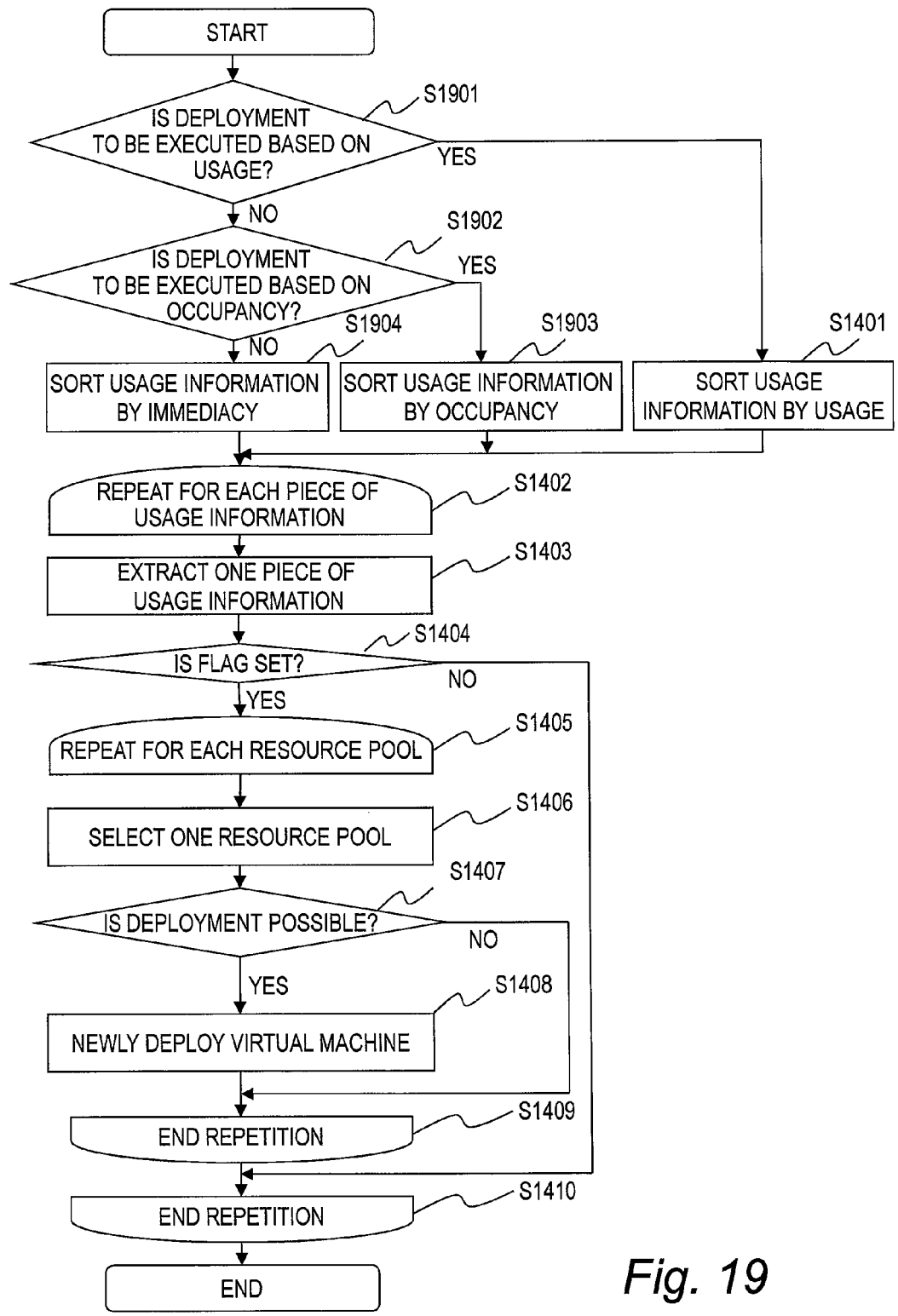
FIG. 19 is a sub-flowchart illustrating the virtual machine deployment processing according to the second embodiment.

The processing of Steps S1001 to S1003 is the same as the first embodiment. In the virtual machine deployment processing in the second embodiment, Step S1701 is newly added so that Step S1702 in which the virtual machines for deployment are deployed based on the calculated occupancy and immediacy is included. Step S1701 is a step of calculating the occupancy and immediacy based on the usage information of the usage information table 1600. Details thereof are illustrated in FIGS. 18A and 18B. In Step S1702, the virtual machines for deployment are deployed based on the occupancy and immediacy calculated in Step S1701. Details thereof are illustrated in FIG. 19.

FIGS. 18A and 18B are flowcharts of usage information creation processing in the second embodiment, and illustrate Step S1701 of FIG. 17 in detail. Therefore, at the time of executing the processing, the usage information from the user column 901 to the usage column 908 and the specifications column 909 of the usage information table 1600 are already stored.

In Step S1801, the usage information of the usage information table 1600 is sorted in ascending order and in the following order: the user column 901; the VM image column 902; the CPU column 903; and the memory column 904. In Step S1802, the log information of the log information table 1500 is sorted in ascending order and in the following order: the user column 801; the VM image column 802; the CPU column 803; and the memory column 804. In Step S1803, repetition of the subsequent processing up to Step S1824 of FIG. 18B is started until all pieces of usage information stored in the usage information table 1600 are referred to.

In Step S1804, one piece of usage information is extracted from the usage information table 1600. In Step S1805, a frequency variable (N), a sum variable of time differences (Ss), and a sum variable of occupancies (Sd) are clear to be 0. In Step S1806, the subsequent processing up to Step S1812 is repeated until all pieces of log information stored in the log information table 1500 are referred to.

In Step S1807, one piece of log information of the log information table 1500 is extracted. In Step S1808, it is determined whether the extracted piece of log information has the same requirement specifications as the usage information extracted in Step S1804. When the log information has the same requirement specifications as the usage information, Step S1809 is executed. When the log information has different requirement specifications from the usage information, the repetition processing of Steps S1806 to S1811 is stopped, and Step S1813 is executed.

In Step S1809, the occupancy written in the log information having the same requirement specifications as the usage information is added to the sum variable of occupancies (Sd). In Step S1810, the start date/time and the requirement date/time written in the log information are each converted to seconds so that a difference therebetween is calculated and the difference is added to the sum variable of time differences (Ss). In Step S1811, the frequency (N) is increased by 1. Step S1812 is a terminal of the repetition processing starting from Step S1806. In this flowchart, while there is the log information having the same requirement specifications as the usage information, Steps S1806 to S1811 described above are repetitively executed. When log information having requirement specifications that are not the same as the usage information is extracted in Step S1808, the repetition processing is stopped, and Step S1813 is executed. Alternatively, after all pieces of log information are referred to, Step S1813 is executed.

In Step S1813, an average value of occupancies and an average value of time differences are calculated based on the calculated sum variable of occupancies (Sd), sum variable of time differences (Ss), and frequency variable (N), and stored in an average occupancy variable (Pd) and an average time difference variable (Ps), respectively. Thereafter, Step S1814 of FIG. 18B is executed.

In processing of Steps S1814 to S1818, the level of occupancy is determined based on the value of the average occupancy variable (Pd). Further, in processing of Steps S1819 to S1823, the level of immediacy is determined based on the value of the average time difference variable (Ps).

To be specific, in Step S1814, it is determined whether the value of the average occupancy variable (Pd) is 75% or more. When the value of the average occupancy variable (Pd) is 75% or more, the occupancy is set to "high" to be stored in the occupancy column 1601 of the usage information table 1600 (Step S1815). When the value of the average occupancy variable (Pd) is 30% or more and less than 75% (Step S1816), the occupancy is set to "intermediate" to be stored in the occupancy column 1601 of the usage information table 1600 (Step S1817). When the value of the average occupancy variable (Pd) is less than 30%, the occupancy is set to "low" to be stored in the occupancy column 1601 of the usage information table 1600 (Step S1818).

In Step S1819, it is determined whether the value of the average time difference variable (Ps) is 15 minutes or less. When the value of the average time difference variable (Ps) is 15 minutes or less, it is indicated that the average time from the reception of the requirements to the start of use is 15 minutes or less. In this case, the immediacy is set to "high" to be stored in the immediacy column 1602 of the usage information table 1600 (Step S1820). When the value of the average time difference variable (Ps) is more than 15 minutes and 4 hours or less (Step S1821), the immediacy is set to "intermediate" to be stored in the immediacy column 1602 of the usage information table 1600 (Step S1822). When the value of the average time difference variable (Ps) is more than 4 hours, the immediacy is set to "low" to be stored in the immediacy column 1602 of the usage information table 1600 (Step S1823).

Through execution of the above-mentioned steps, the occupancy and immediacy are calculated for one piece of usage information of the usage information table 1600 extracted in Step S1804. Step S1824 is a terminal of the repetition processing starting from Step S1803. When all pieces of usage information of the usage information table 1600 are extracted to calculate the occupancy and immediacy, the repetition processing is stopped, and Step S1825 is executed. In Step S1825, in order to return the log information sorted in Step S1802 to the original state, the log information is sorted in ascending order based on the requirement date/time stored in the requirement date/time column 807 of the log information table 1500.

For the thresholds (75%, 30%, and the like) used in determining the occupancy level and the thresholds (15 minutes, 4 hours, and the like) used in determining the immediacy level in Step S1814 and the subsequent steps, an administrator who operates the resource management program is allowed to set the values arbitrarily by adding processing of outputting a separate deployment option screen. This allows the administrator to perform operation management more flexibly. FIG. 20 illustrates an output example of the input screen.

FIG. 20 illustrates a level option input screen 2000 according to the second embodiment. The input screen 2000 has fields in which values that determine the weighting on the usage and the levels of the occupancy and immediacy may be input. A row 2011 includes fields for inputting the values that determines the weighting on the usage. A row 2012 includes fields for inputting the values that determine the occupancy level. The threshold for determining the "intermediate" level and the threshold for determining the "low" level have the same value. Therefore, the administrator may input two values for the "high" and "intermediate" levels. A row 2013 includes fields for inputting the values that determine the immediacy level. In the usage information creation processing of FIG. 18 in the second embodiment, the level is determined in units of minutes and hours, but the thresholds for determining the level may be input in a uniform unit of "minutes" as illustrated in FIG. 20.

The level option input screen 2000 also includes a "criterion" column 2001. The resource management program 110 in the first embodiment once sorts the usage information of the usage information table 900 in descending order with reference to the usage 908 column to deploy the virtual machines. In the second embodiment, not only the resource management program deploys the virtual machines with reference to the usage, but also the administrator may deploy the virtual machines based on a criterion set in advance. To be specific, the administrator is allowed to select one of three checkboxes shown in the criterion column 2001. For example, when the administrator checks the checkbox of occupancy, the resource management program 110 deploys the virtual machines with reference to the occupancy.

After completing inputs for all items, the administrator operates an "apply" button. In response to the operation on the apply button, the resource management program 110 stores input values for all items in the memory 102 or the HDD 108. When the administrator operates a "cancel" button, the resource management program 110 discards the input values for all items.

As described above, the administrator is allowed to select the criterion for the virtual machines to be deployed so that the administrator may deploy in advance the virtual machines that are flexible to users having various requirements.

FIG. 19 is a sub-flowchart illustrating the virtual machine deployment processing, and illustrates Step S1702 of FIG. 17 in detail. In Step S1901, it is determined whether a checkbox specified by the administrator in the "criterion" column 2001 of the level option input screen 2000 of FIG. 20 is the usage. The resource management program 110 has stored the values set in the level option input screen 2000 in the memory, the HDD, or the like, and hence in Step S1901, the stored values are referred to for the determination. When the administrator selects the usage, the usage information of the usage information table 1600 is sorted in descending order based on the usage column 908 (Step S1401), and when the administrator selects the occupancy (Step S1902), the usage information of the usage information table 1600 is sorted in descending order based on the occupancy column 1601 (Step S1903). When the administrator selects the immediacy, the usage information of the usage information table 1600 is sorted in descending order based on the immediacy column 1602 (S1903). After that, the resource management program executes the same steps as those of the flowchart illustrated in FIG. 14. As described above, the resource management program sorts the usage information in accordance with the criterion specified by the administrator so that the deployment of the virtual machines based on the selected criterion may be executed.

Third Embodiment

In the first and second embodiments, the user allocates one virtual machine, but in a third embodiment of this invention, the user may allocate a plurality of virtual machines at one time. In addition, the user may give several options to the virtual machines to be searched for.

Figure 21:
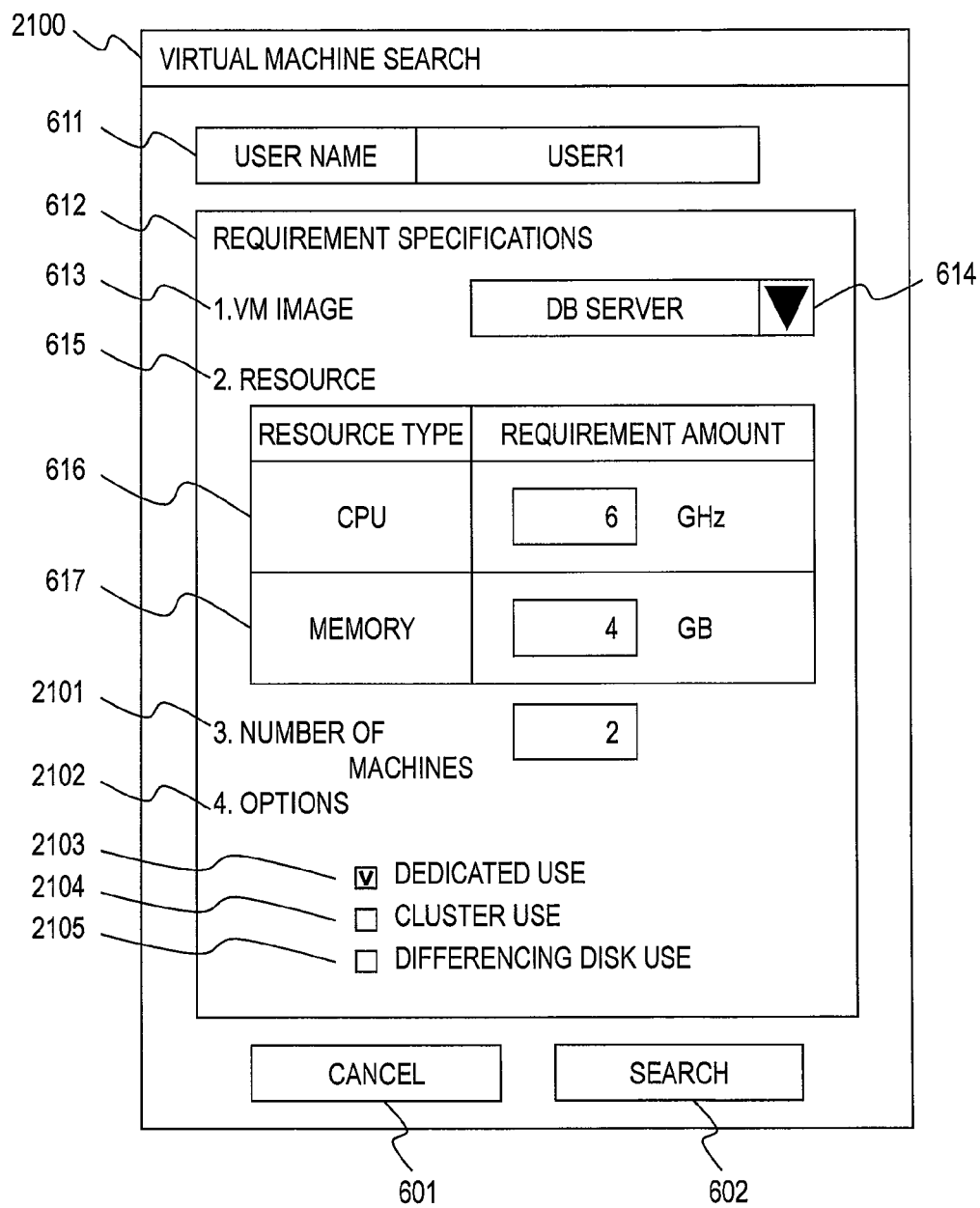
FIG. 21 is an explanatory diagram illustrating an input screen in requirement reception processing according to a third embodiment of this invention.

FIG. 21 illustrates an input screen in requirement reception processing according to the third embodiment. The input screen of the requirement reception processing in the third embodiment is similar to the input screen (FIG. 6) of the requirement reception processing in the first embodiment. Different portions are a "number of machines" input field 2101 with which the number of virtual machines may be specified by the user, and an "option" input field 2102 for selecting from three options. The option input field 2102 includes the following three checkboxes: a checkbox for dedicated use option 2103; a checkbox for cluster use option 2104; and a checkbox for differencing disk use option 2105.

A dedicated use option is an option in which the user uses resources of the virtual machines as a dedicated virtual machine not to be shared with another user. When the option is specified by the user, the resource management program 110 outputs virtual machines, which operate on one physical computer on which a virtual machine that operates for another user is not allocated, as search results to be allocated to the user.

A cluster use option is an option for allocating at least two virtual machines required by the user and constructing a configuration in which the virtual machines operate on different physical computers. This is a mode for improving a fault tolerance of the virtual machines allocated by the user. When the option is specified along with the number of machines by the user, the resource management program 110 searches for the specified number of virtual machines, and identifies a physical computer on which the virtual machines operate. Next, the resource management program 110 searches for the specified number of virtual machines on a physical computer different from the physical computer. The resource management program 110 finally searches for twice the specified number of virtual machines.

FIG. 22 illustrates a hypervisor configuration table 2200 according to the third embodiment. The hypervisor configuration table 2200 in the third embodiment has a structure similar to that of the hypervisor configuration table 200 (FIG. 2) in the first embodiment. In the hypervisor configuration table 2200 in the third embodiment, the same columns as those of the hypervisor configuration table 200 in the first embodiment are denoted by the same reference numerals as those illustrated in FIG. 2 to omit the description thereof. To the hypervisor configuration table 2200 in the third embodiment, a "dedicated" column 2201, a "cluster" column 2202, and a "differencing disk" column 2203 are newly added. The dedicated column 2201 stores an identifier when the user specifies the dedicated use option and the resource management program 110 allocates the virtual machine for dedicated use. The hypervisor configuration table 2200 stores information indicating that the virtual machine VM5 is allocated for dedicated use. The cluster column stores an identifier indicating that the virtual machine has a cluster configuration when the user specifies the cluster use option and the resource management program 110 allocates two virtual machines in the cluster configuration. To be specific, the VM identifier of the virtual machine with which the cluster is constituted is stored. For example, in the hypervisor configuration table 2200 of FIG. 22, "VM6" is stored in the cluster column 2202 of the virtual machine VM1. This means that the virtual machine VM1 has a cluster configuration which is constituted with a virtual machine having the VM identifier of "VM6", that is, the virtual machine VM1 and the virtual machine VM6 constitute a cluster. The resource management program 110 uses the cluster column as described above so as to not only recognize that the virtual machine has a cluster configuration but also easily identify the virtual machine with which the cluster is constituted. The differencing disk column 2203 stores an identifier indicating that the virtual machine uses a differencing disk.

Figure 23:
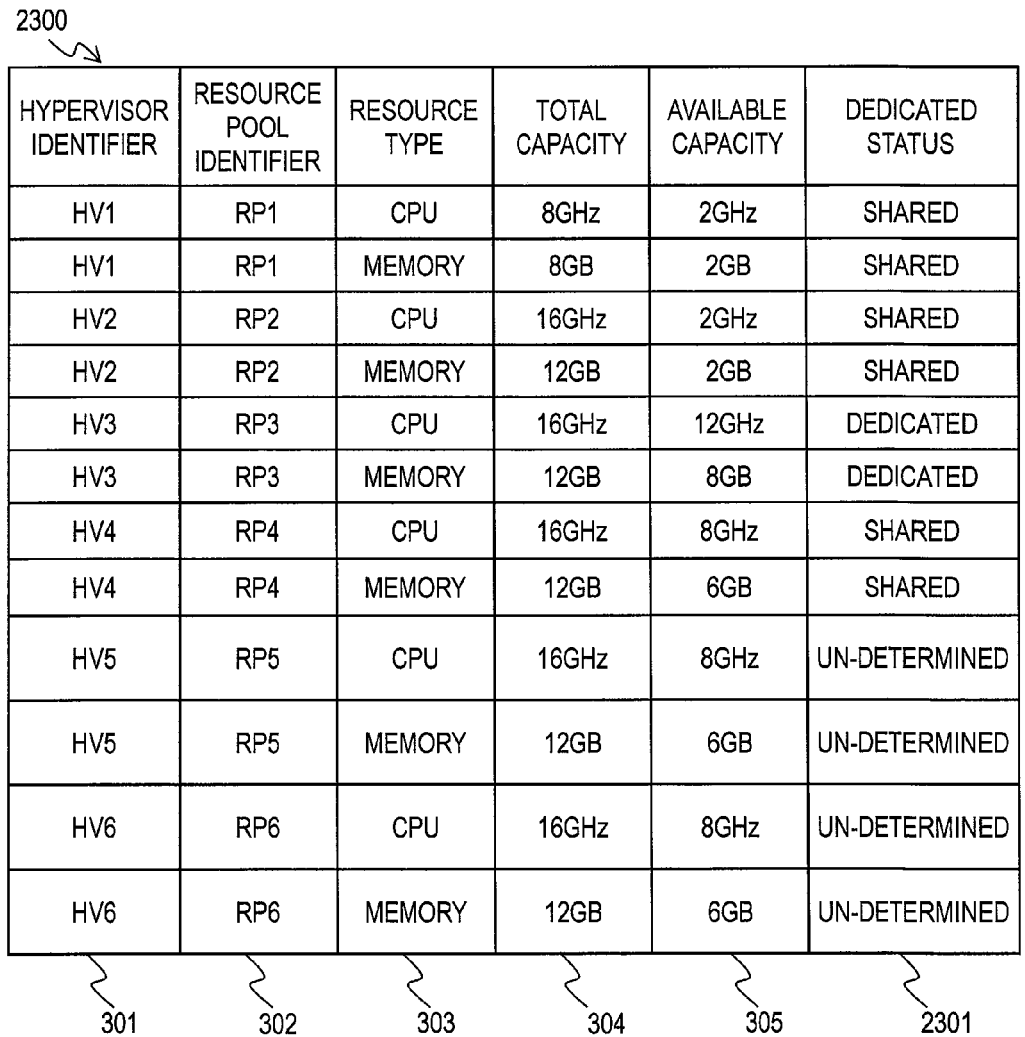
FIG. 23 is an explanatory diagram illustrating a VM pool information table according to the third embodiment.

FIG. 23 illustrates a VM pool information table according to the third embodiment. A VM pool information table 2300 in the third embodiment has a configuration similar to that of the VM pool information table 300 (FIG. 3) in the first embodiment, except that a "dedicated status" column 2301 is newly included. The dedicated status column 2301 stores identifiers indicating whether each resource is in dedicated use or in shared use. To be specific, when the resource is in dedicated use, "dedicated" is stored, and when the resource is in shared use, "shared" is stored. Moreover, when the resource is used by a virtual machine for deployment and is undetermined as to whether the resource is to be used in the dedicated use or the shared use, "undetermined" is stored.

Figure 24:
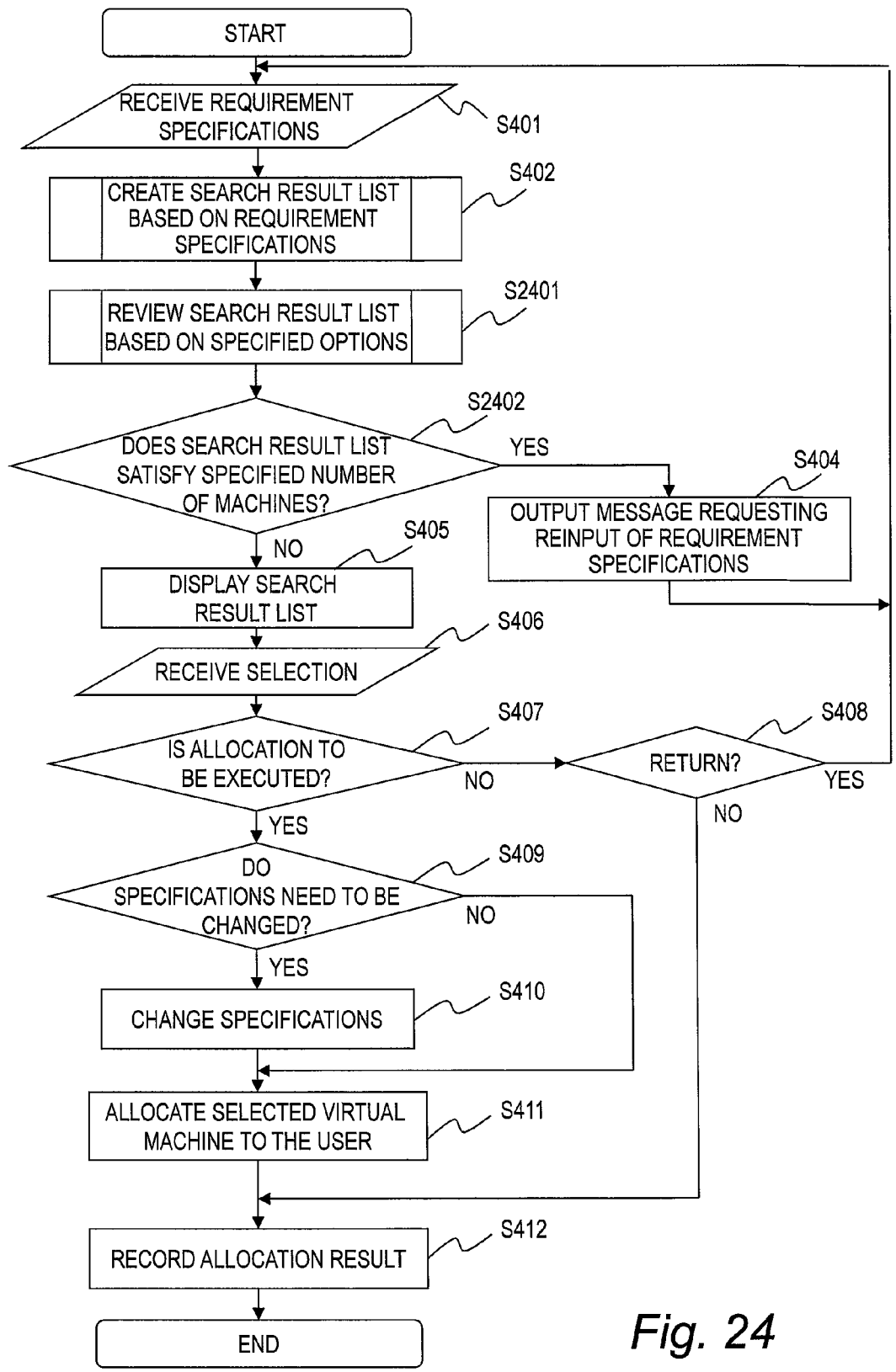
FIG. 24 is a flowchart illustrating requirement specification processing according to the third embodiment.

FIG. 24 is a flowchart illustrating requirement specification processing according to the third embodiment. This flowchart includes steps similar to those of the flowchart of the requirement specification processing in the first embodiment, except that Step S2401 is newly added and that what is determined in Step S403 is changed to newly form Step S2402. After the search result list is created based on the specifications required by the user in Step S402, the search result list is reviewed based on the option specified by the user in Step S2401. In Step S402, a plurality of candidate virtual machines are extracted based on the resource amounts, which are the specifications required by the user, and hence the option specified by the user is not considered. In particular, even when the user specifies the dedicated use option, virtual machines that share resources with another virtual machine are also extracted in Step S402.

Figure 25:
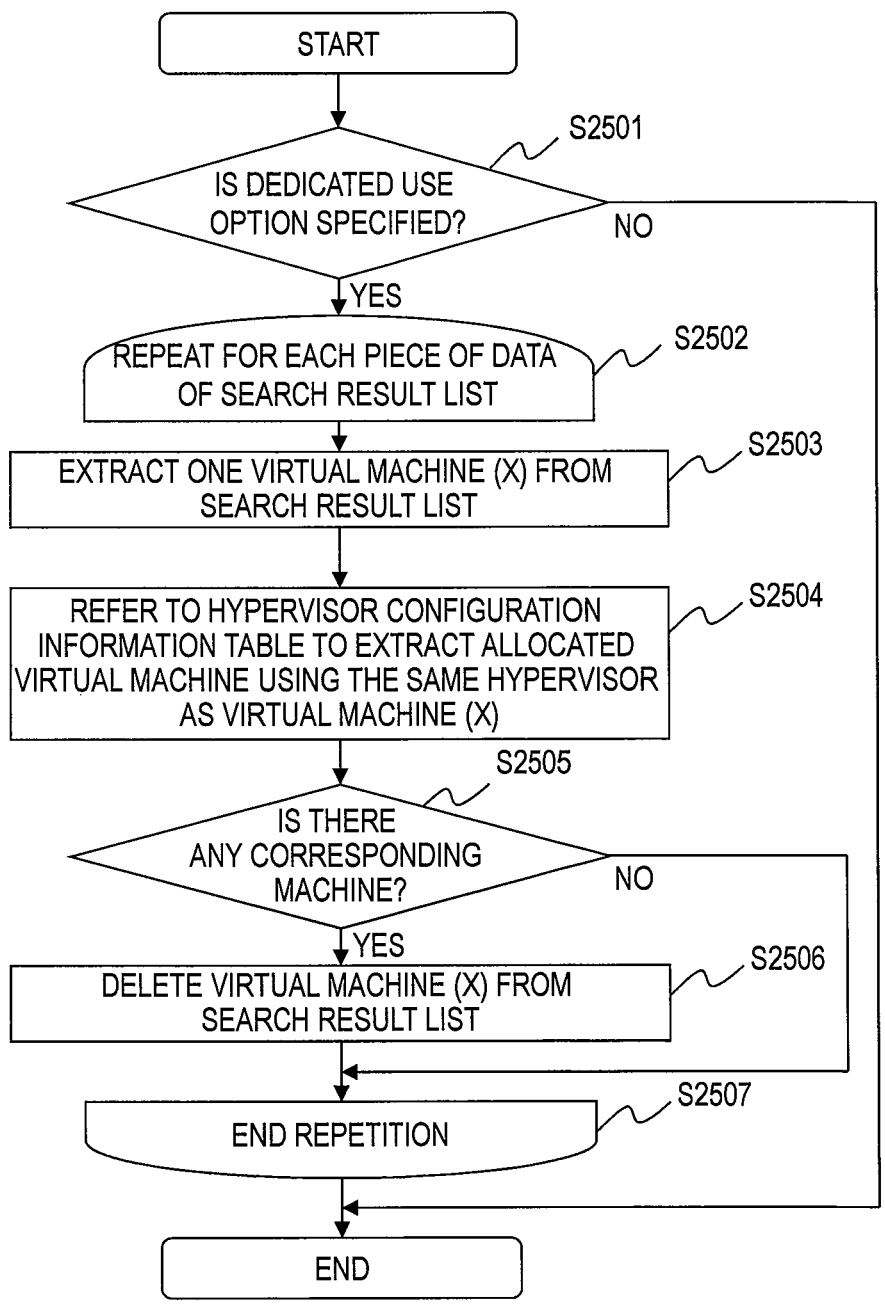
FIG. 25 is a flowchart illustrating search result list review processing, according to the third embodiment.

Therefore, in Step S2401, contents of the created search result list are checked to delete virtual machines that do not comply with the specified dedicated use option from the list. Details of this processing are illustrated in FIG. 25. When the cluster use option as another option is specified, all the extracted virtual machines may be used and a selection may be made to form a cluster configuration, and hence the search result list does not need to be reviewed as in the case of the dedicated use option. The differencing disk use option also does not need to review the search result list as in the case of the cluster use option.

Thereafter, in Step S2402, it is determined whether the number of virtual machines finally extracted in the search result list is more than the number of machines specified by the user. When the number is the specified number of machines or more, Step S405 is executed. On the other hand, when the number is smaller than the specified number of machines, a message requesting reinput of the requirement specifications is output (Step S404). Alternatively, the resource management program 110 may make the same determination as Step S403 instead of Step S2402. In other words, even if the number of extracted virtual machines is smaller than the number of machines specified by the user, when at least one virtual machine is extracted, Step S405 is executed. The subsequent processing is the same as that of the flowchart of FIG. 4. It should be noted, however, that the user may specify a plurality of machines, and hence processing details are changed so that the processing for the plurality of machines may be executed in the steps of the flowchart.

FIG. 25 is a flowchart illustrating search result list review processing, and illustrates Step S2401 of the requirement specification processing in FIG. 24 in detail. This flowchart illustrates processing of deleting, when the user selects the dedicated use option, the virtual machines that cannot be put in dedicated use from the search result list, of the virtual machines extracted in the search result list. In Step S2501, it is determined whether the user has specified the dedicated use option. When the user has specified the dedicated use option, Step S2502 is executed. When the dedicated use option is not specified, the processing is ended. In Step S2502, processing up to Step S2507 is repeated until data of all the virtual machines stored in the search result list is read. In Step S2503, one virtual machine is extracted from the search result list. For the purpose of description, the extracted virtual machine is denoted by "X". In Step S2504, a hypervisor that controls the extracted virtual machine (X) is identified, and the hypervisor configuration table 2200 is referred to, to thereby extract another virtual machine which is controlled by the same hypervisor and allocated. In Step S2505, it is determined whether a corresponding virtual machine is extracted in Step S2504. When the corresponding virtual machine is extracted, Step S2506 is executed. In Step S2506, the virtual machine (X) shares resources with the other allocated virtual machine, and hence the virtual machine (X) is identified to be a virtual machine that cannot be put into dedicated use. Therefore, the virtual machine (X) is deleted from the search result list. Step S2507 is a terminal of the repetition processing starting from Step S2502.

FIG. 26 illustrates an example of the search result list when the user specifies only the dedicated use option. A search result list 2600 is output instead of the search result list 712 on the search result list output screen illustrated in FIG. 7. The search result list 2600 has a structure similar to that of the search result list 712 of FIG. 7, except that the following two columns are included: a "hypervisor identifier" column 2601 and a "dedicated status" column 2602. The hypervisor identifier column 2601 stores an identifier of the hypervisor that controls the found virtual machine. As the identifier of the hypervisor, the identifier stored in the hypervisor identifier column 201 of the hypervisor configuration table 2200 of FIG. 22 is used. The dedicated status column 2602 stores information indicating the dedicated status of the found virtual machine. As the information indicating the dedicated status, the information stored in the dedicated status column 2301 of the VM pool information table 2300 of FIG. 23 is used.

The search result list 2600 illustrated in FIG. 26 includes four virtual machines. When the user selects, for example, a virtual machine VM8 indicated by a row 2611 and selects a checkbox in the selection column 701, the resource management program 110 shows an indication that the information on a virtual machine VM9 indicated by a row 2612 cannot be selected (for example, an italic and a strikethrough). The virtual machine VM8 and the virtual machine VM9 share resources. Therefore, when the user selects the virtual machine VM8, the resource management program 110 shows the indication that the user cannot select the virtual machine VM9 with which the resources are shared. When the user deselects the virtual machine VM8, that is, operates the checkbox again to remove the check, the resource management program 110 deletes the indication that the virtual machine VM9 cannot be selected. The resource management program 110 displays the virtual machine that can be selected and the virtual machine that cannot be selected in different manners in response to the selection from the user as described above so that the requirement of the dedicated use option specified by the user may be realized.

FIG. 27 illustrates an example of the search result list when the user specifies the differencing disk use option. A search result list 2700 is obtained by adding a "differencing disk" column 2701 to the search result list 2600 illustrated in FIG. 26. In the differencing disk column 2701, checkboxes are displayed. When the user checks the virtual machine in which the user wants to use the differencing disk, the resource management program performs control so that the VM image of the checked virtual machine may be used as the differencing disk.

FIG. 28 illustrates an example of a search result list 2800 when the user specifies the cluster use option. The search result list 2800 is obtained by providing columns on a cluster 1 side and a cluster 2 side to the search result list 2700 illustrated in FIG. 27. The cluster 1 side has the same structure as the structure of the search result list illustrated in FIG. 27, and a "cluster 2 side" column 2801 has a matrix of the extracted virtual machines. In the search result list 2800 illustrated in FIG. 28, four virtual machines are extracted, and hence the cluster 2 side column 2801 includes four columns. A checkbox is displayed in each cell of the cluster 2 side column 2801 so that the user may select two virtual machines at the same time in a cluster configuration. For combinations that cannot be selected as the cluster configuration, marks "-" are displayed. For example, a combination of VM8 and VM9 cannot be selected. A condition for the combination that can be selected as a cluster configuration is that the virtual machines operate on different physical computers. Therefore, a combination of virtual machines that operate on the same physical computer cannot be selected as a cluster configuration. The resource management program 110 identifies if the combination condition is established by referring to the hypervisor configuration table 2200 and the VM pool information table 2300.

When the user selects a cluster configuration with the combination of VM8 and VM10, the resource management program 110 displays a "strike-through" in the checkbox of another virtual machine (VM11) to be combined with VM8 because VM8 has been selected, and hence shows that VM11 cannot be selected. Next, a "strike-through" is displayed in the checkboxes of other virtual machines (for example, VM9) to be combined with VM10. In the example illustrated in FIG. 28, the combination of virtual machines that can be finally selected by the user is only the combination of "VM9" and "VM11".

As described above, the resource management program changes an output format of the search result list in response to the contents of the option specifications by the user, and controls a range that is selectable so as to adapt to various combination of option specifications by the user flexibly.

FIG. 29 illustrates a log information table 2900 according to the third embodiment. The log information table 2900 in the third embodiment has a structure similar to that of the log information table 1500 (FIG. 15) in the second embodiment, except for including the following columns: a "number of machines" column 2901; a "dedicated" column 2902; a "cluster" column 2903; and a "differencing" column 2904. The number of machines column 2901 stores the number of machines specified by the user. For example, a row 2911 stores "2" in the number of machines column 2901. The virtual machine is, when the user requires "2" "DB servers" of "6 GHz" and "4 GB", the first of the two virtual machines allocated by the resource management program 110. The remaining virtual machine is the virtual machine indicated by the next row 2912. The row 2912 similarly stores "2" in the number of machines column. The virtual machine is the second of the two virtual machines allocated in response to the same user requirements as the row 2911. The reason why such numerical value is stored is to calculate an average number of machines with the use of the number of machines column 2901 of the log information table 2900 by the resource management program 110.

The dedicated column 2902, the cluster column 2903, and the differencing column 2904 store contents of the options specified by the user. "Shared" in the dedicated column 2902 is stored when the user does not specify the dedicated use option. When the user specifies the dedicated use option, the resource management program 110 stores "dedicated". The cluster column 2903 stores "yes" when the user selects the cluster use option, and stores "no" when the cluster use option is not selected. The differencing column 2904 stores "yes" when the user specifies the differencing disk use option, and stores "no" when the user does not specify the differencing disk use option.

FIG. 30 illustrates a usage information table 3000 according to the third embodiment. The usage information table 3000 in the third embodiment has a structure similar to that of the usage information table 1600 (FIG. 16) in the second embodiment, except for including the following columns: an "average number of machines" column 3001; a "dedicated degree" column 3002; a cluster degree 3003; and a differencing degree 3004.

The average number of machines column 3001 stores an average value calculated based on the numbers stored in the number of machines column 2901 of the log information table 2900.

The dedicated degree column 3002 stores a value of "shared" or "dedicated" stored in the dedicated column 2902 of the log information table 2900, or a calculated proportion. For example, when the user has required the requirement specifications of "web server", "8 GHz", and "2 GB" 10 times in the past, and the user has specified "dedicated" in each of the requirements, the resource management program 110 calculates the dedicated degree as 100%. The number of requirements may be calculated from the sum of the numbers of allocations stored in the columns 905 to 907 of the usage information table 3000. The resource management program 110 determines the dedicated degree as a proportion of the number of times "dedicated" is specified to the total number of allocations.

The cluster degree column 3003 stores a proportion calculated based on a value of "yes" or "no" stored in the cluster column 2903 of the log information table 2900. As in the case of the previous dedicated degree column 3002, the resource management program 110 determines the cluster degree as a proportion of the number of times "yes" is specified to the total number of allocations.

The differencing degree 3004 stores a proportion calculated based on a value of "yes" or "no" stored in the differencing column 2904 of the log information table 2900. The resource management program 110 calculates the proportion by a method similar to that of the cluster degree column 3003.

The processing of calculating each column of the usage information table 3000 (not shown) may be realized by adding steps of calculating the average number of machines, the dedicated degree, the cluster degree, and the differencing degree to the processing in the second embodiment illustrated in FIGS. 18A and 18B.

Moreover, when the virtual machines for deployment are to be deployed with the use of the columns of the usage information table 3000, selection columns of "dedicated degree", "cluster degree", and "differencing degree" are added to the level option input screen (FIG. 20) in the second embodiment so as to be selectable as a criterion by the user. When the user selects any one of the "dedicated degree", "cluster degree", and "differencing degree" criteria, the usage information is sorted based on the specified criterion as illustrated in FIG. 19 in the second embodiment. Then, based on the sorted usage information, the virtual machines are deployed based on the usage information determined as the specifications.

Moreover, when the value of the dedicated degree column 3002 of the usage information stored in the Usage information table 3000 is "100%", it is also possible to secure the virtual machines for deployment as "dedicated". In this case, when the user specifies the dedicated use option, the virtual machines secured as "dedicated" are extracted in the search result list. To the contrary, even when the user does not specify the dedicated use option, the virtual machines secured as "dedicated" may be extracted in the search result list to be selected by the user.

As described above, the requirement specifications including the option specifications by the user are recorded in the log information to grasp the use tendency of the user so that the virtual machines more suited to the user's requirements may be deployed before the virtual machines are activated. In this manner, when the user requires a virtual machine, not only the virtual machines that match the requirement specifications but also the virtual machines which do not match the requirement specifications but can be easily changed may be presented as search results to the user, with the result that not only the range of selections presented to the user may be increased, but also the time it takes to actually allocate the virtual machine to the user may be reduced.

While the present invention has been described in detail and pictorially in the accompanying drawings, the present invention is not limited to such detail but covers various obvious modifications and equivalent arrangements, which fall within the purview of the appended claims.

What is claimed is:

1. A resource management server coupled to a plurality of physical computers via a network, for allocating a plurality of virtual machines by using resources included in the plurality of physical computers, the resource management server comprising:
   a processor;
   a memory connected to the processor;
   an input interface connected to the processor;
   a display;
   an output interface connected to the processor and the display,
   wherein the memory stores:
   a pool management table storing pool management information, of a plurality of pools, including a correspondence relationship among the plurality of physical computers, a total amount of the resources included in the plurality of physical computers, and a total amount of available resources which are included in the plurality of physical computers and not allocated to the virtual machines;
   instructions, that when executed by the processor, cause the processor to:
   manage resource management information including a correspondence relationship between deployed virtual machines implemented in the plurality of physical computers and use amounts of resources used by the deployed virtual machines;
   receive, via the input interface, an allocation requirement for a new virtual machine along with requirement specifications including amounts of resources required by the new virtual machine to be allocated; and
   search and identify any deployed virtual machines included in the resource management information having amounts of resources that satisfy the amount of resources of the received requirement specifications of new virtual machine to be allocated, and any deployed virtual machines which do not have the amounts of resources that satisfy the requirement specifications but which allow the amounts of resources that satisfy the requirement specifications to be satisfied by adding the available resources included in the pool management information, and add the identified deployed virtual machines to a search result list,
   search and identify any pool of the plurality of pools stored in the pool management table having the total amount of available resources that satisfy the amount of resources of the received requirement specifications of the new virtual machine to be allocated, and add the identified pool to the search result list,
   display on the display the search result list indicating each identified deployed virtual machine and each identified pool and the current specifications of each identified deployed virtual machine and each identified pool, and
   after displaying the search result list on the display, receive, via the input interface, a selection of an identified deployed virtual machine or identified pool to be allocated from the displayed search result list and execute allocation of the selection.

2. A resource management server according to claim 1,
   wherein the memory further stores: a log information table storing the received requirement specifications as log information,
   a usage calculation table storing a frequency at which the resources are allocated, and a usage of the requirement specifications based on the calculated frequency,
   instructions that when executed by the processor, cause the processor to:
   refer to the log information table to calculate a frequency at which the resources are allocated and calculate a usage of the requirement specifications based on the calculated frequency,
   determine specifications for deployment based on the calculated usage, and
   deploy virtual machines having the amounts of resources that satisfy the determined specifications for deployment by referring to the total amount of available resources, and for managing a correspondence relationship between the virtual machines for deployment that are newly deployed and the amounts of resources allocated to the virtual machines for deployment by using the resource management information.

3. A resource management server according to claim 2,
   wherein the memory further stores instructions that when executed by the processor, cause the processor to: when an identified deployed virtual machine which does not have the amounts of resources that satisfy the requirement specifications is selected:
   add available resources to the resources of the identified deployed virtual machine to satisfy the requirement specifications by adding from the available resources included in the pool management information.

4. A resource management server according to claim 3,
   wherein the memory further stores instructions that when executed by the processor, cause the processor to:
   obtain a requirement time at which the identified deployed virtual machine is allocated and a use start time of the allocated virtual machine based on the received requirement specifications, and stores the obtained requirement time and use start time in the log information table,
   calculate a difference between the requirement time and the use start time stored in the log information, and calculate an immediacy of the requirement specifications based on the time difference, and
   deploy the virtual machines having the amounts of resources that satisfy the determined specifications for deployment based on the immediacy.

5. A resource management server according to claim 3,
   wherein the memory further stores instructions that when executed by the processor, cause the processor to: calculate an occupancy of the resources based on the use amounts of the resources used by the identified deployed virtual machine based on the received requirement specifications, and store the calculated occupancy in the log information table, calculate an occupancy of the requirement specifications based on the occupancy stored in the log information table, and deploy the virtual machines having the amounts of resources that satisfy the determined specifications for deployment based on the calculated occupancy.

6. A resource management method performed by a resource management server coupled to a plurality of physical computers via a network which allocates a plurality of virtual machines by using resources included in the plurality of physical computers, the resource management server including a processor for executing a program, and a storage device to be accessed by the processor, the resource management method including the steps of:

storing, by the resource management server, resource management information including a correspondence relationship between deployed virtual machines implemented in the plurality of physical computers and use amounts of resources used by the deployed virtual machines in the storage device;

storing, by the resource management server, pool management information, of a plurality of pools, including a correspondence relationship among the plurality of physical computers, a total amount of resources included in the plurality of physical computers, and a total amount of available resources which are included in the plurality of physical computers and not allocated to the virtual machines in the storage device;

receiving, by the resource management server, an allocation requirement for a new virtual machine along with requirement specifications including amounts of resources required by the new virtual machine to be allocated;

searching and identifying, by the resource management server, any deployed virtual machines included in the resource management information having amounts of resources that satisfy the amounts of resources of the requirement specifications of the new virtual machine to be allocated, and any deployed virtual machines which do not have the amounts of resources that satisfy the requirement specifications but which allow the amounts of resources that satisfy the requirement specifications to be satisfied by adding the available resources included in the pool management information, and adding the identified deployed virtual machines to a search result list;

searching and identifying any pool of the plurality of pools stored in the pool management table having the total amount of available resources that satisfy the amount of resources of the received requirement specifications of the new virtual machine to be allocated, and add the identified pool to the search result list, displaying on a display the search result list indicating each identified deployed virtual machine and each identified pool and the current specifications of each identified deployed virtual machine and each identified pool, and after displaying the search result list on the display, receiving, via an input interface, a selection of an identified deployed virtual machine or identified pool to be allocated from the displayed search result list and executing allocation of the selection.

7. A resource management method according to claim 6, further including the steps of:

storing, by the resource management server, the received requirement specifications as log information in the storage device;

referring, by the resource management server, to the log information stored in the storage device to calculate a frequency at which the resources are allocated, and calculating a usage of the requirement specifications based on the calculated frequency;

determining, by the resource management server, specifications for deployment based on the calculated usage; and deploying, by the resource management server, virtual machines having the amounts of resources that satisfy the determined specifications for deployment by referring to the total amount of available resources, and storing a correspondence relationship between the virtual machines for deployment that are newly deployed and the amounts of resources allocated to the virtual machines for deployment in the resource management information.

8. A resource management method according to claim 7, further including the step of:

when an identified deployed virtual machine which does not have the amounts of resources that satisfy the requirement specifications is selected, adding, by the resource management server available resources to the resources of the deployed virtual machine to satisfy the requirement specifications by adding from the available resources included in the pool management information.

9. A resource management method according to claim 8, further including steps of:

obtaining, by the resource management server, a requirement time at which the identified deployed virtual machine is allocated based on the received requirement specifications and a use start time of the allocated virtual machine, and storing the obtained requirement time and use start time in the log information;

calculating, by the resource management server, a difference between the requirement time and the use start time stored in the log information, and calculating an immediacy of the requirement specifications based on the time difference; and deploying, by the resource management server, the virtual machines having the amounts of resources that satisfy the determined specifications for deployment based on the immediacy.

10. A resource management method according to claim 8, further including steps of:

calculating, by the resource management server, an occupancy of the resources based on the use amounts of the resources used by the allocated virtual machine based on the received requirement specifications, and storing the calculated occupancy in the log information;

calculating, by the resource management server, an occupancy of the requirement specifications based on the occupancy stored in the log information; and deploying, by the resource management server, the virtual machines for deployment having the amounts of resources that satisfy the determined specifications for deployment based on the calculated occupancy.

11. A non-transitory machine-readable storage medium, storing instructions for allocating a plurality of virtual machines by using resources included in a plurality of physical computers, the resource management server being coupled to the plurality of physical computers via a network, the instructions that, when executed, cause the resource management server to:

manage resource management information including a correspondence relationship between deployed virtual machines implemented in the plurality of physical computers and use amounts of resources used by the deployed virtual machines in a storage device;

store pool management information, of a plurality of pools, including a correspondence relationship among the plurality of physical computers, a total amount of resources included in the plurality of physical computers, and a total amount of available resources which are included in the plurality of physical computers and not allocated to the virtual machines in the storage device;

receive an allocation requirement for a new virtual machine along with requirement specifications including amounts of resources required by the new virtual machine to be allocated; and search and identify any deployed virtual machines included in the resource management information having amounts of resources that satisfy the amount of resources of the requirement specifications of the new virtual machine to be allocated, and any deployed virtual machines which do not have the amounts of resources that satisfy the requirement specifications but which allow the amounts of resources that satisfy the requirement specifications to be satisfied by adding the available resources included in the pool management information, and add the identified virtual machines to a search result list, search and identify any pool of the plurality of pools stored in the pool management table having the total amount of available resources that satisfy the amount of resources of the received requirement specifications of the new virtual machine to be allocated, and add the identified pool to the search result list, display on a display the search result list indicating each identified deployed virtual machine and each identified pool and the current specifications of each identified deployed virtual machine and each identified pool, and after displaying the search result list on the display, receive, via an input interface, a selection of an identified deployed virtual machine or identified pool to be allocated from the displayed search result list and execute allocation of the selection.

12. A non-transitory machine-readable storage medium according to claim 11, wherein the instructions further cause the resource management server to:

store the received requirement specifications as log information in the storage device;

refer to the log information stored in the storage device to calculate a frequency at which the resources are allocated, and calculate a usage of the requirement specifications based on the calculated frequency;

determine specifications for deployment based on the calculated usage; and deploy virtual machines t having the amounts of resources that satisfy the determined specifications for deployment by referring to the total amount of available resources, and store a correspondence relationship between the virtual machines for deployment that are newly deployed and the amounts of resources allocated to the virtual machines for deployment in the resource management information.

13. A non-transitory machine-readable storage medium according to claim 12, wherein the instructions further cause the resource management server to:

when an identified deployed virtual machine which does not have the amounts of resources that satisfy the requirement specifications is selected, add available resources to the resources of the identified deployed virtual machine to satisfy the requirement specifications by adding from the available resources included in the pool management information.

14. A non-transitory machine-readable storage medium according to claim 13, wherein the instructions further cause the resource management server to:

obtain a requirement time at which the identified deployed virtual machine is allocated based on the received requirement specifications and a use start time of the allocated virtual machine, and store the obtained requirement time and use start time in the log information;

calculate a difference between the requirement time and the use start time stored in the log information, and calculating an immediacy of the requirement specifications based on the time difference; and deploy the virtual machines having the amounts of resources that satisfy the determined specifications for deployment based on the immediacy.

15. A non-transitory machine-readable storage medium according to claim 13, wherein the instructions further cause the resource management server to:

calculate an occupancy of the resources based on the use amounts of the resources used by the allocated virtual machine based on the received requirement specifications, and storing the calculated occupancy in the log information;

calculate an occupancy of the requirement specifications based on the occupancy stored in the log information; and deploy the virtual machines having the amounts of resources that satisfy the determined specifications for deployment based on the calculated occupancy.

* * * * *